United States Patent
Ishizaka et al.

(10) Patent No.: US 7,770,412 B2
(45) Date of Patent: Aug. 10, 2010

(54) INTEGRATED UNIT FOR REFRIGERANT CYCLE DEVICE AND MANUFACTURING METHOD OF THE SAME

(75) Inventors: Naohisa Ishizaka, Okazaki (JP); Thuya Aung, Kariya (JP); Hiroshi Oshitani, Toyota (JP); Yoshiaki Takano, Kosai (JP); Mika Gocho, Obu (JP); Hirotsugu Takeuchi, Nagoya (JP); Yoshiyuki Okamoto, Nagoya (JP)

(73) Assignee: Denso Corporation, Kariya (JP)

( * ) Notice: Subject to any disclaimer, the term of this patent is extended or adjusted under 35 U.S.C. 154(b) by 655 days.

(21) Appl. No.: 11/654,316

(22) Filed: Jan. 17, 2007

(65) Prior Publication Data

US 2007/0169511 A1    Jul. 26, 2007

(30) Foreign Application Priority Data

Jan. 20, 2000    (JP) .............................. 2006-012462

(51) Int. Cl.
*F25B 1/06*    (2006.01)
(52) U.S. Cl. .......................................... 62/500; 62/170
(58) Field of Classification Search .................. 62/170, 62/500, 525; 165/132, 174, 176, 178
See application file for complete search history.

(56) References Cited

U.S. PATENT DOCUMENTS

| | | | | |
|---|---|---|---|---|
| 3,705,622 | A | * | 12/1972 | Schwarz ...................... 165/143 |
| 6,065,573 | A | * | 5/2000 | Kelly ...................... 188/319.1 |
| 6,161,616 | A | | 12/2000 | Haussmann |
| 6,260,379 | B1 | * | 7/2001 | Manwill et al. ................ 62/509 |
| 6,477,857 | B2 | | 11/2002 | Takeuchi et al. |
| 6,574,987 | B2 | | 6/2003 | Takeuchi et al. |
| 7,178,359 | B2 | | 2/2007 | Oshitani et al. |

(Continued)

FOREIGN PATENT DOCUMENTS

CN        1283261        2/2001

(Continued)

OTHER PUBLICATIONS

Office Action dated Jan. 26, 2009 in U.S. Appl. No. 11/654,206.

(Continued)

*Primary Examiner*—Cheryl J Tyler
*Assistant Examiner*—Justin Loffredo
(74) *Attorney, Agent, or Firm*—Harness, Dickey & Pierce, PLC

(57) ABSTRACT

An integrated unit for a refrigerant cycle device includes an ejector having a nozzle part for decompressing refrigerant, and an evaporator located to evaporate the refrigerant to be drawn into a refrigerant suction port of the ejector or the refrigerant discharged from an outlet of the ejector. The evaporator includes a plurality of tubes defining refrigerant passages through which refrigerant flows, a tank that is disposed at one end side of the tubes for distributing refrigerant into the tubes and for collecting the refrigerant from the tubes. The tank extends in a tank longitudinal direction that is parallel to an arrangement direction of the tubes, and is provided with an end portion in the tank longitudinal direction. Furthermore, the end portion has a hole portion for inserting the ejector, and the ejector is inserted into an inner space of the tank from the hole portion.

24 Claims, 21 Drawing Sheets

U.S. PATENT DOCUMENTS

| | | | |
|---|---|---|---|
| 7,254,961 | B2 | 8/2007 | Oshitani et al. |
| 2001/0025499 | A1 | 10/2001 | Takeuchi et al. |
| 2002/0184903 | A1 | 12/2002 | Takeuchi et al. |
| 2003/0209030 | A1 | 11/2003 | Nishida et al. |
| 2004/0159121 | A1 | 8/2004 | Horiuchi et al. |
| 2005/0039895 | A1* | 2/2005 | Inaba et al. ............ 165/153 |
| 2005/0178150 | A1 | 8/2005 | Oshitani et al. |
| 2005/0268644 | A1* | 12/2005 | Oshitani et al. ......... 62/500 |
| 2007/0163294 | A1 | 7/2007 | Aung et al. |
| 2007/0169508 | A1 | 7/2007 | Ichiyanagi |
| 2007/0169510 | A1 | 7/2007 | Ishizaka et al. |
| 2007/0169512 | A1 | 7/2007 | Ishizaka et al. |

FOREIGN PATENT DOCUMENTS

| | | |
|---|---|---|
| JP | 6-14622 | 2/1994 |
| JP | 06-137695 | 5/1994 |
| JP | 2002-318018 | 10/2002 |
| JP | 2003-329336 | 11/2003 |
| JP | 2006-3070 | 1/2006 |
| WO | WO 2006/109617 | 10/2006 |

OTHER PUBLICATIONS

Office Action dated Jun. 6, 2008 in Chinese Application No. 2006 10 165935.0 with English translation thereof.

Office Action dated Jun. 20, 2008 in Chinese Application No. 2006 10 165933.1.

Office Action dated Sep. 23, 2008 in German Application No. 10 2007 002549.3.

Office Action dated Aug. 11, 2009 in U.S. Appl. No. 11/654,206.

Office Action dated Feb. 5, 2009 in related U.S. Appl. No. 11/653,622.

Office Action dated Jun. 8, 2010 in corresponding Japanese Application No. 2006-12462.

* cited by examiner

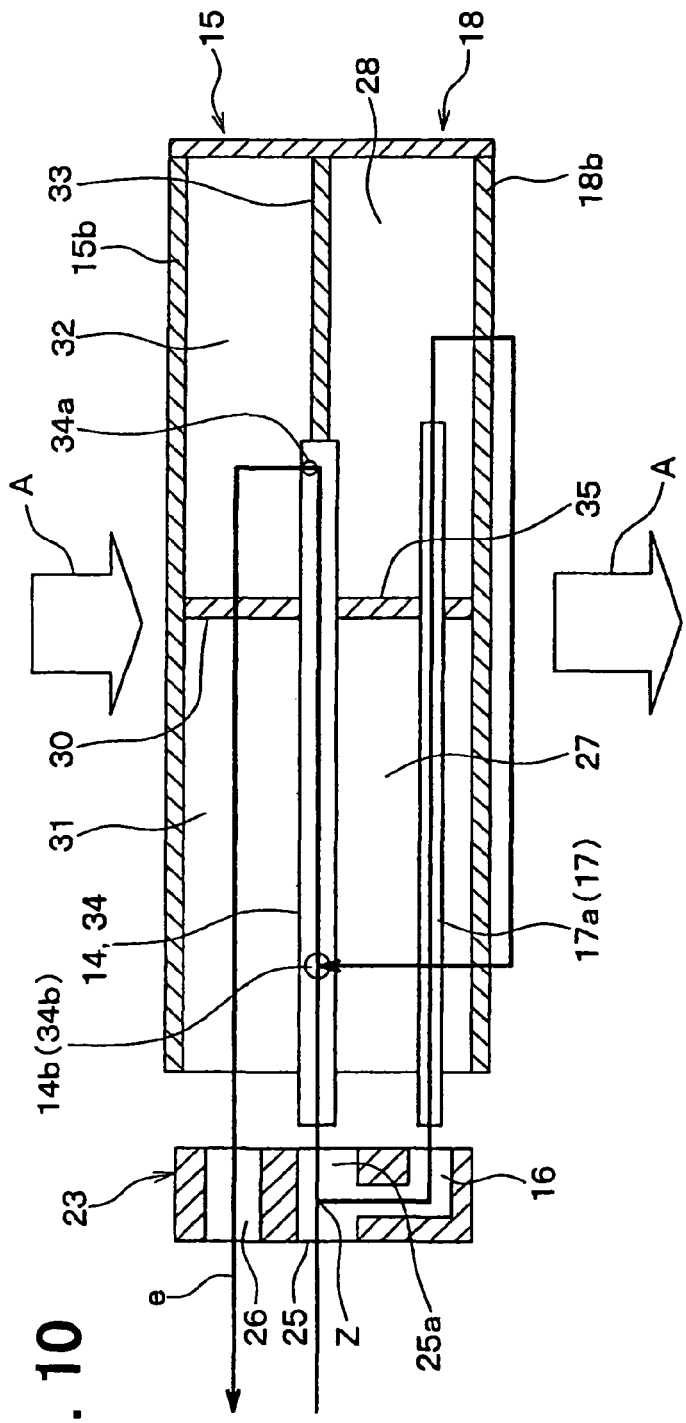
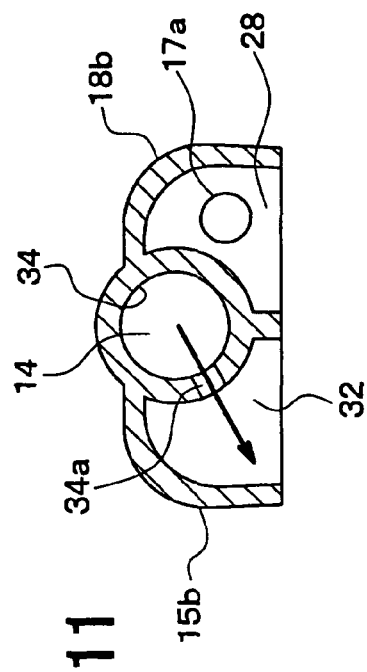

INTEGRATED UNIT FOR REFRIGERANT CYCLE DEVICE AND MANUFACTURING METHOD OF THE SAME

CROSS REFERENCE TO RELATED APPLICATION

This application is based on Japanese Patent Application No. 2006-12462 filed on Jan. 20, 2006, the contents of which are incorporated herein by reference in its entirety.

FIELD OF THE INVENTION

The present invention relates to an integrated unit with an ejector and an evaporator for a refrigerant cycle device, and a manufacturing method of the same.

BACKGROUND OF THE INVENTION

An ejector refrigerant cycle device is known which includes an ejector serving as refrigerant decompression means and refrigeration circulating means. The ejector refrigerant cycle device is useful for, for example, a vehicle air conditioner, or a vehicle refrigeration system for refrigerating and freezing loads on a vehicle, or the like. The refrigerant cycle device is also useful for a fixed refrigeration cycle system, such as an air conditioner, a refrigerator, or a freezer. This kind of ejector refrigerant cycle device is disclosed in, for example, JP-B2-3322263 (corresponding to U.S. Pat. No. 6,477,857, U.S. Pat. No. 6,574,987).

JP-B2-3265649 describes an ejector refrigerant cycle device which includes a first evaporator disposed at an outlet side of an ejector, a gas-liquid separator located at an outlet side of the first evaporator, and a second evaporator disposed between a liquid refrigerant outlet side of the gas-liquid separator and a refrigerant suction port of the ejector. Furthermore, the ejector, the first evaporator and the second evaporator are integrated as a unit in the ejector refrigerant cycle device.

However, in the ejector refrigerant cycle device, the ejector is integrated with the first and second evaporators outside of the first and second evaporators. In this case, a mounting space for mounting the ejector is required outside the first and second evaporators, thereby the integrated unit may be difficult to be mounted in a limited space of the vehicle.

SUMMARY OF THE INVENTION

In view of the foregoing problems, it is an object of the present invention to provide an integrated unit of an ejector and an evaporator, which can be mounted in a vehicle with a small mounting space. It is another object of the present invention to provide a manufacturing method of an integrated unit of an ejector and an evaporator for a refrigerant cycle device.

According to an aspect of the present invention, an integrated unit for a refrigerant cycle device includes an ejector and an evaporator integrated with each other. The ejector has a nozzle part which decompresses refrigerant, and a refrigerant suction port from which refrigerant is drawn by a high-speed refrigerant flow jetted from the nozzle part. The refrigerant jetted from the nozzle part and the refrigerant drawn from the refrigerant suction port are mixed and discharged from an outlet of the ejector. The evaporator is located to evaporate the refrigerant to be drawn into the refrigerant suction port or the refrigerant discharged from the outlet of the ejector. Furthermore, the evaporator includes a plurality of tubes defining refrigerant passages through which refrigerant flows, and a tank that is disposed at one end side of the tubes for distributing refrigerant into the tubes and for collecting the refrigerant from the tubes. The tank extends in a tank longitudinal direction that is parallel to an arrangement direction of the tubes, the tank is provided with an end portion in the tank longitudinal direction, and the end portion has a hole portion for inserting the ejector. In addition, the ejector is inserted into an inner space of the tank from the hole portion.

Because the ejector is inserted into the tank of the evaporator, the size of the integrated unit can be made small, thereby improving the mounting performance of the integrated unit in a vehicle.

For example, the evaporator includes an evaporator part located to evaporate the refrigerant to be drawn into the refrigerant suction, and the inner space of the tank includes a space part for collecting the refrigerant from the tubes. Furthermore, the ejector is inserted into the space part of the inner space of the tank, and the refrigerant suction port directly communicates with the space part. Therefore, the refrigerant suction port of the ejector can be directly connected with the tank of the evaporator without using a pipe.

A connection block may be located at the end portion of the tank in the tank longitudinal direction. In this case, the connection block is provided with a refrigerant inlet for introducing the refrigerant and a refrigerant outlet for discharging the refrigerant, and the hole portion is provided in the connection block. Alternatively, an ejector fixing member for fixing the ejector concentrically with the hole portion may be provided in the tank. In this case, the ejector is fastened and fixed to the ejector fixing member. For example, the ejector fixing member includes a fixing plate that is located in the tank for fixing the ejector. In addition, an intervening plate may be located between the connection block and the end portion of the tank in the tank longitudinal direction.

According to another aspect of the present invention, a refrigerant cycle device includes: a compressor for compressing refrigerant; a radiator for cooling the refrigerant from the compressor; an ejector that has a nozzle part for decompressing the refrigerant from the radiator, and a refrigerant suction port from which refrigerant is drawn by a high-speed refrigerant flow jetted from the nozzle part; and an evaporator located to evaporate the refrigerant to be drawn into the refrigerant suction port or the refrigerant discharged from an outlet of the ejector. In this case, the evaporator includes a plurality of tubes defining refrigerant passages through which refrigerant flows, and a tank that is disposed at one end side of the tubes for distributing refrigerant into the tubes and for collecting the refrigerant from the tubes. The tank is provided with a hole portion for inserting the ejector at an end portion in a tank longitudinal direction, and the ejector is inserted into an inner space of the tank from the hole portion. Accordingly, the size of the evaporator including the ejector can be reduced thereby improving the mounting performance of the refrigerant cycle device.

According to a further aspect of the present invention, a manufacturing method of an integrated unit for a refrigerant cycle device includes a step of assembling evaporator members to form a heat exchanger structure that includes a plurality of tubes defining refrigerant passages through which refrigerant flows, and a tank that is disposed at one end side of the tubes and extends in a tank longitudinal direction; a step of integrally brazing the heat exchanger structure; and a step of inserting an ejector into the tank from a side of an end portion of the tank in a tank longitudinal direction, after the brazing. Because the ejector is inserted into the tube after the heat exchanger structure is brazed at a high temperature, it can prevent an accuracy of the nozzle part of the ejector from being deteriorated due to a high-temperature condition during the brazing.

For example, a connection block having a hole portion may be connected to the end portion of the tank before the brazing. In this case, the connection block and the heat exchanger structure are integrally brazed in the brazing, and the ejector is inserted into the tank through the hole portion of the connection block, after the brazing.

BRIEF DESCRIPTION OF THE DRAWINGS

Additional objects and advantages of the present invention will be more readily apparent from the following detailed description of embodiments when taken together with the accompanying drawings. In the drawings:

FIG. 10 is a longitudinal sectional view of an evaporator tank in the integrated unit of FIG. 9;

FIG. 11 is a schematic cross-sectional view of the evaporator tank of the integrated unit of FIG. 9;

DETAILED DESCRIPTION OF THE PREFERRED EMBODIMENTS

First Embodiment

A first embodiment of the present invention will be described below with reference to FIGS. 1 to 5. In the embodiment, a heat exchanger of the present invention will be typically used for a refrigeration cycle of an ejector refrigerant cycle device. A unit for the refrigeration cycle is a heat exchanger unit, such as an ejector-equipped evaporator unit, for example.

This unit is connected to other components of the refrigeration cycle, including a condenser, a compressor, and the like, via piping to constitute a refrigerant cycle device including an ejector. The integrated unit of the embodiment is used for an indoor equipment (e.g., evaporator) for cooling air. The unit may be used as an outdoor equipment in other embodiments.

Figure 1:
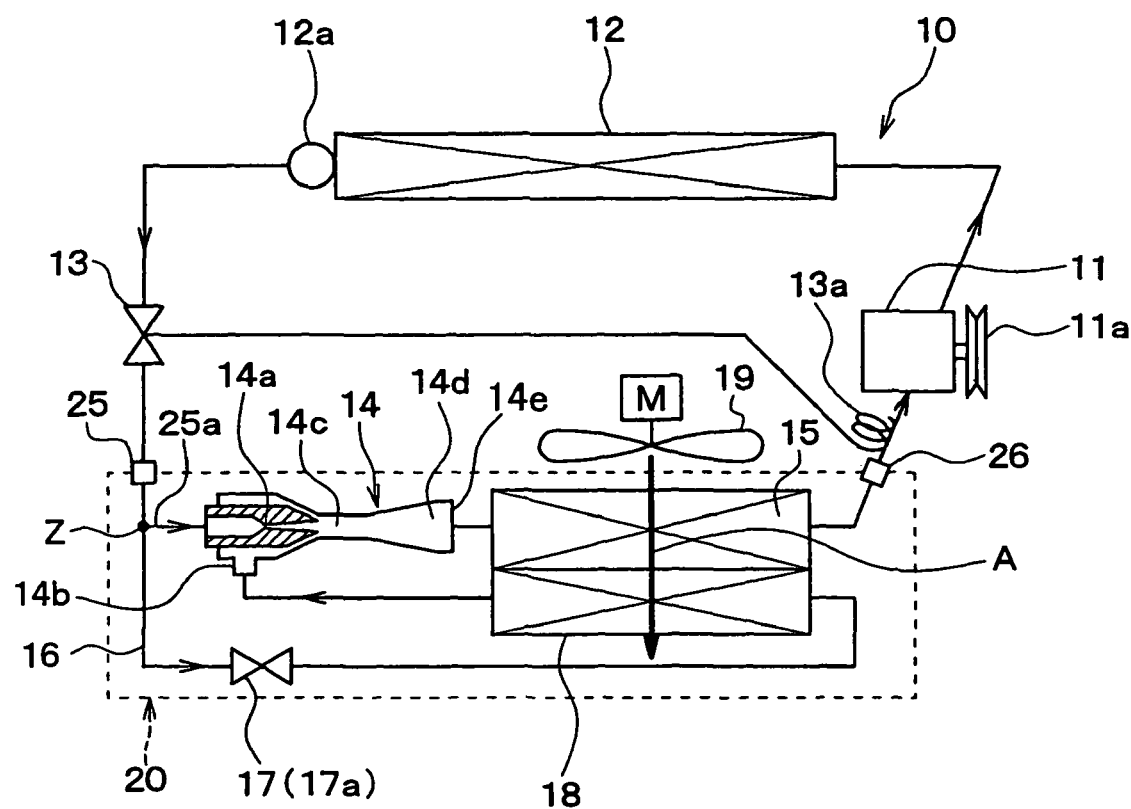
FIG. 1 is a refrigerant circuit diagram of an ejector refrigerant cycle device for a vehicle according to a first embodiment of the present invention.

In an ejector refrigerant cycle device 10 shown in FIG. 1, a compressor 11 for drawing and compressing refrigerant is driven by an engine for vehicle traveling (not shown) via an electromagnetic clutch 11a, a belt, or the like.

As the compressor 11, may be used either a variable displacement compressor which can adjust a refrigerant discharge capability by a change in discharge capacity, or a fixed displacement compressor which can adjust a refrigerant discharge capability by changing an operating ratio of the compressor through engagement and disengagement of the electromagnetic clutch 11a. If an electric compressor is used as the compressor 11, the refrigerant discharge capability can be adjusted or regulated by adjustment of the number of revolutions of an electric motor.

A radiator 12 is disposed on a refrigerant discharge side of the compressor 11. The radiator 12 exchanges heat between the high-pressure refrigerant discharged from the compressor 11 and an outside air (i.e., air outside a compartment of a vehicle) blown by a cooling fan (not shown) thereby to cool the high-pressure refrigerant.

As the refrigerant for the ejector refrigerant cycle device 10 in the embodiment, is used a refrigerant whose high pressure does not exceed a critical pressure, such as a flon-based refrigerant, or a HC-based refrigerant, so as to form a vapor-compression subcritical cycle. Thus, the radiator 12 serves as a condenser for cooling and condensing the refrigerant.

A liquid receiver 12a is provided at a refrigerant outlet side of the radiator 12. The liquid receiver 12a has an elongated tank-like shape, as is known in the art, and constitutes a vapor-liquid separator for separating the refrigerant into vapor and liquid phases to store therein an excessive liquid refrigerant of the refrigerant cycle. At a refrigerant outlet of the liquid receiver 12a, the liquid refrigerant is derived from the lower part of the interior in the tank-like shape. In the embodiment, the liquid receiver 12a is integrally formed with the radiator 12.

The radiator 12 may have a known structure which includes a first heat exchanger for condensation positioned on the upstream side of a refrigerant flow, the liquid receiver 12a for allowing the refrigerant introduced from the first heat exchanger for condensation and for separating the refrigerant into vapor and liquid phases, and a second heat exchanger for supercooling the saturated liquid refrigerant from the liquid receiver 12a.

A thermal expansion valve 13 is disposed on an outlet side of the liquid receiver 12a. The thermal expansion valve 13 is a decompression unit for decompressing the liquid refrigerant from the liquid receiver 12a, and includes a temperature sensing part 13a disposed in a refrigerant suction passage of the compressor 11.

The thermal expansion valve 13 detects a degree of superheat of the refrigerant at the compressor suction side based on the temperature and pressure of the suction side refrigerant of the compressor 11, and adjusts an opening degree of the valve (refrigerant flow rate) such that the superheat degree of the refrigerant on the compressor suction side becomes a predetermined value which is preset, as is known in the art.

An ejector 14 is disposed at a refrigerant outlet side of the thermal expansion valve 13. The ejector 14 is decompression means for decompressing the refrigerant as well as refrigerant circulating means (kinetic vacuum pump) for circulating the refrigerant by a suction effect (entrainment effect) of the refrigerant flow ejected at high speed.

The ejector 14 includes a nozzle part 14a for further decompressing and expanding the refrigerant (the middle-pressure refrigerant) by restricting a path area of the refrigerant having passed through the expansion valve 13 to a small level, and a refrigerant suction port 14b disposed in the same space as a refrigerant jet port of the nozzle part 14a for drawing the vapor-phase refrigerant from a second evaporator 18 as described later.

A mixer 14c is provided on the downstream side part of the refrigerant flow of the nozzle part 14a and the refrigerant suction part 14b, for mixing a high-speed refrigerant flow from the nozzle part 14a and a sucked refrigerant from the refrigerant suction port 14b. A diffuser 14d serving as a pressure-increasing portion is provided on the downstream side of the refrigerant flow of the mixer 14c. The diffuser 14d is formed in such a manner that a path area of the refrigerant is generally increased toward downstream from the mixer 14c. The diffuser 14d serves to increase the refrigerant pressure by decelerating the refrigerant flow, that is, to convert the speed energy of the refrigerant into the pressure energy.

A first evaporator 15 is connected to an outlet 14e (the tip end of the diffuser 14d) of the ejector 14. The outlet side of the first evaporator 15 is connected to a suction side of the compressor 11.

On the other hand, a refrigerant branch passage 16 is provided to be branched from an inlet side of the ejector 14. That is, the refrigerant branch passage 16 is branched at a position between the refrigerant outlet of the thermal expansion valve 13 and the refrigerant inlet of the nozzle part 14a of the ejector 14. The downstream side of the refrigerant branch passage 16 is connected to the refrigerant suction port 14b of the ejector 14. A point Z indicates a branch point of the refrigerant branch passage 16.

In the refrigerant branch passage 16, a throttle 17 is disposed. On the refrigerant flow downstream side away from the throttle 17, a second evaporator 18 is disposed. The throttle 17 serves as a decompression unit which performs a function of adjusting a refrigerant flow rate into the second evaporator 18. More specifically, the throttle 17 can be constructed with a fixed throttle, such as a capillary tube, or an orifice.

In the first embodiment, two evaporators 15 and 18 are incorporated into an integrated structure with an arrangement as described later. These two evaporators 15 and 18 are accommodated in a case not shown, and the air (air to be cooled) is blown by a common electric blower 19 through an air passage formed in the case in the direction of an arrow "A", so that the blown air is cooled by the two evaporators 15 and 18.

The cooled air by the two evaporators 15 and 18 is fed to a common space to be cooled (not shown). This causes the two evaporators 15 and 18 to cool the common space to be cooled. Among these two evaporators 15 and 18, the first evaporator 15 connected to a main flow path on the downstream side of the ejector 14 is disposed on the upstream side (upwind side) of the air flow A, while the second evaporator 18 connected to the refrigerant suction port 14b of the ejector 14 is disposed on the downstream side (downwind side) of the air flow A.

When the ejector refrigerant cycle device 10 of the embodiment is used as a refrigeration cycle for a vehicle air conditioner, the space within the vehicle compartment is a space to be cooled. When the ejector refrigerant cycle device 10 of the embodiment is used for a refrigeration cycle for a freezer car, the space within the freezer and refrigerator of the freezer car is the space to be cooled.

Figure 2:
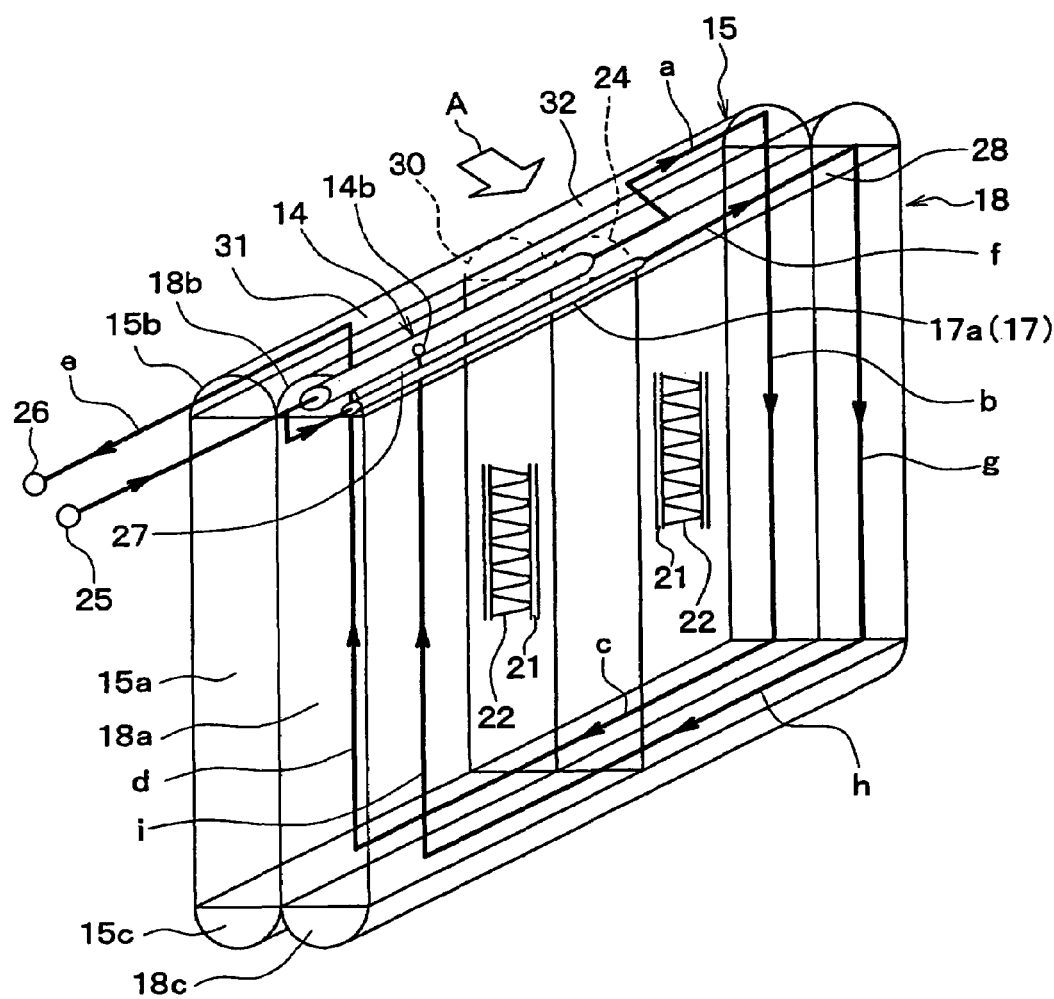
FIG. 2 is a perspective view showing a schematic structure of an integrated unit for the ejector refrigerant cycle device in the first embodiment.
Figure 3:
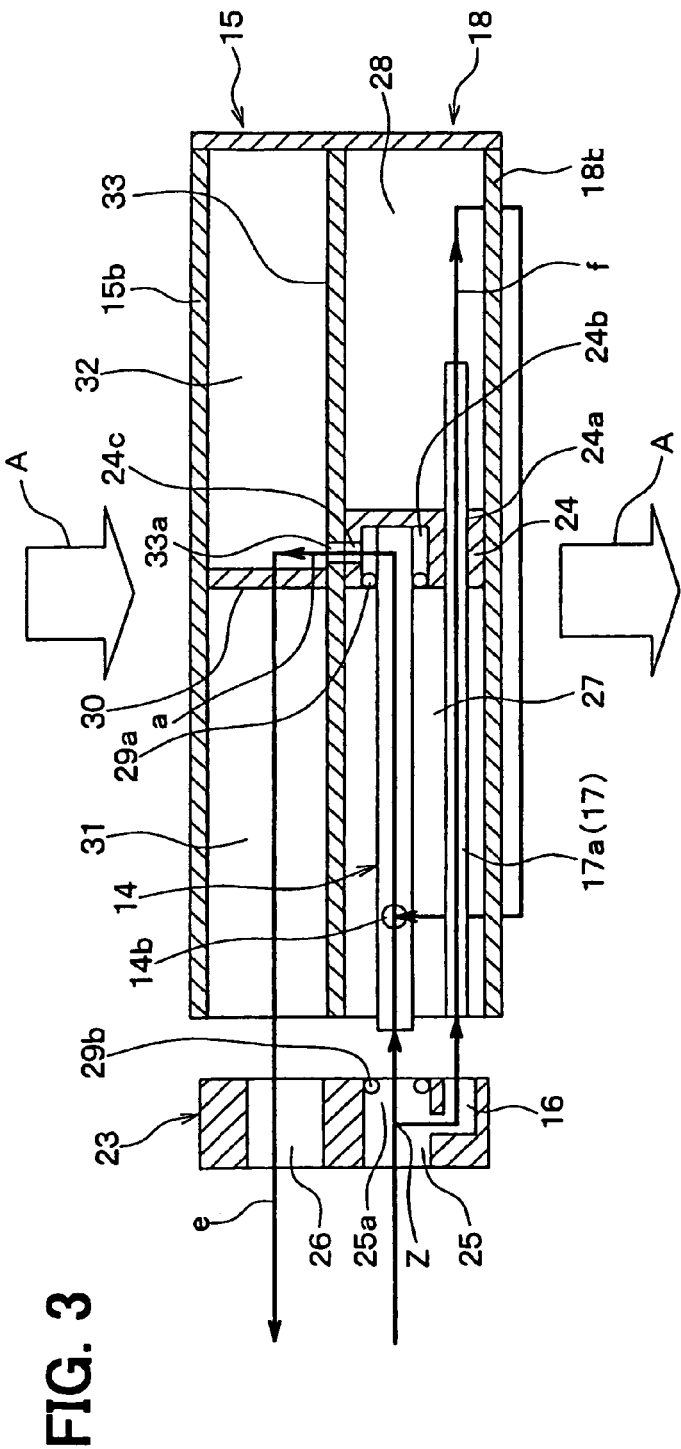
FIG. 3 is a longitudinal sectional view of an evaporator tank in the integrated unit of FIG. 2.
Figure 4:
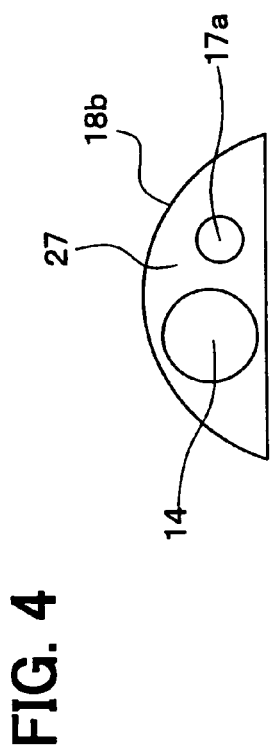
FIG. 4 is a schematic cross-sectional view of the evaporator tank of the integrated unit of FIG. 2.

In the embodiment, the ejector 14, the first and second evaporators 15 and 18, and the throttle 17 are incorporated into one integrated unit 20. Now, specific examples of the integrated unit 20 will be described below in detail with reference to FIGS. 2 to 4. FIG. 2 is a perspective view showing the entire schematic structure of the integrated unit 20, FIG. 3 is a longitudinal sectional view of an upper tank portion (evaporator tank) of the first and second evaporators 15, 18, and FIG. 4 is a schematic cross-sectional view of the upper tank portion of the first and second evaporators 15, 18.

First, an example of the integrated structure including the two evaporators 15 and 18 will be explained below with reference to FIG. 2. In the embodiment of FIG. 2, the two evaporators 15 and 18 can be formed integrally into a completely single evaporator structure. Thus, the first evaporator 15 constitutes an upstream side area of the single evaporator structure in the direction of the air flow A, while the second evaporator 18 constitutes a downstream side area of the single evaporator structure in the direction of the air flow A.

The first evaporator 15 and the second evaporator 18 have the same basic structure, and include heat exchange cores 15a and 18a, and tanks 15b, 15c, 18b, and 18c positioned on both upper and lower sides of the heat exchange cores 15a and 18a, respectively.

The heat exchanger cores 15a and 18a respectively include a plurality of tubes 21 extending in a tube longitudinal direction. The tube 21 corresponds to a heat source fluid passage in which a heat source fluid for performing a heat exchange with a heat-exchange medium flows. One or more passages for allowing a heat-exchange medium, namely air to be cooled in the embodiment, to pass therethrough are formed between these tubes 21.

Between these tubes 21, fins 22 are disposed, so that the tubes 21 can be connected to the fins 22. Each of the heat exchange cores 15a and 18a is constructed of a laminated structure of the tubes 21 and the fins 22. These tubes 21 and fins 22 are alternately laminated in a lateral direction of the heat exchange cores 15a and 18a. In other embodiments or examples, any appropriate structure without using the fins 22 in the cores 15a and 18a may be employed.

In FIG. 2, only some of the fins 22 are shown, but in fact the fins 22 are disposed over the whole areas of the heat exchange cores 15a and 18a, and the laminated structure including the tubes 21 and the fins 22 is disposed over the whole areas of the heat exchange cores 15a and 18a. The blown air by the electric blower 19 is adapted to pass through voids (clearances) in the laminated structure.

The tube 21 constitutes the refrigerant passage through which refrigerant flows, and is made of a flat tube having a flat cross-sectional shape in the air flow direction A. The fin 22 is a corrugated fin made by bending a thin plate in a wave-like shape, and is connected to a flat outer surface of the tube 21 to expand a heat transfer area of the air side.

The tubes 21 of the heat exchanger core 15a and the tubes 21 of the heat exchanger core 18a independently constitute the respective refrigerant passages. The tanks 15b and 15c on both the upper and lower sides of the first evaporator 15, and the tanks 18b and 18c on both the upper and lower sides of the second evaporator 18 independently constitute the respective refrigerant passage spaces.

Each of the tanks 15b, 15c, 18b, 18c of the first and second evaporators 15, 18 extends in an arrangement direction of the tubes 21. For example, in FIG. 2, the arrangement direction of the tubes 21 is the left and right direction, which is perpendicular to the air flow direction A.

The tanks 15b and 15c on both the upper and lower sides of the first evaporator 15 have tube fitting holes (not shown) into which upper and lower ends of the tube 21 of the heat exchange core 15a are inserted and attached, so that both the upper and lower ends of the tube 21 are communicated with the inside space of the tanks 15b and 15c, respectively.

Similarly, the tanks 18b and 18c on both the upper and lower sides of the second evaporator 18 have tube fitting holes (not shown) into which upper and lower ends of the tube 21 of the heat exchange core 18a are inserted and attached, so that both the upper and lower ends of the tube 21 are communicated with the inside space of the tanks 18b and 18c, respectively.

Thus, the tanks 15b, 15c, 18b and 18c disposed on both the upper and lower sides serve to distribute the refrigerant streams to the respective tubes 21 of the heat exchange cores 15a and 18a, and to collect the refrigerant streams from these tubes 21.

Since the two upper tanks 15b and 18b are adjacent to each other, the two upper tanks 15b and 18b can be molded integrally. The same can be made for the two lower tanks 15c and 18c. It is apparent that the two upper tanks 15b and 18b may be molded independently as independent components, and that the same can be made for the two lower tanks 15c and 18c.

Material suitable for use in the evaporator components, such as the tube 21, the fin 22, the tanks 15b, 15c, 18b, and 18c, may include, for example, aluminum, which is metal with excellent thermal conductivity and brazing property. By forming each component using the aluminum material, the entire structures of the first and second evaporators 15 and 18 can be assembled integrally with brazing.

In the embodiment, a capillary tube 17a or the like constituting the throttle 17 and first and second connection blocks 23, 24 shown in FIG. 3 are assembled integrally to the first and second evaporators 15 and 18 with brazing.

On the other hand, the ejector 14 has the nozzle part 14a in which a fine passage is formed with high accuracy. Brazing of the ejector 14 may cause heat deformation of the nozzle part 14a at high temperature in brazing (at brazing temperature of aluminum: about 600° C.). This will disadvantageously result in the fact that the shape and dimension or the like of the passage of the nozzle part 14a cannot be maintained according to a predetermined design.

Thus, the ejector 14 is assembled to the evaporator side after integrally brazing the first and second evaporators 15 and 18, the first and second connection blocks 23, 24 and the capillary tube 17a, and the like.

More specifically, an assembly structure including the ejector 14, the capillary tube 17a, and the first and second connection blocks 23, 24 and the like will be explained below. The capillary tube 17a and the first and second connection blocks 23, 24 are made of the same aluminum material as that of the evaporator components. As shown in FIG. 3, the first connection block 23 is fixed by brazing to a side end of the upper tanks 15b, 18b of the first and second evaporators 15, 18, and forms one refrigerant inlet 25 and one of the refrigerant outlet 26 of the integrated unit 20 shown in FIG. 1.

The refrigerant inlet 25 branches, in a midstream of the first connection block 23 in the thickness direction, into a main passage 25a serving as a first passage directed to the inlet of the ejector 14, and a branch passage 16 serving as a second passage directed to the inlet of the capillary tube 17a. This part of the branch passage 16 corresponds to an inlet part of the branch passage 16 shown in FIG. 1. Thus, a branch point Z of FIG. 1 is provided inside the first connection block 23.

The refrigerant outlet 26 is composed of one simple passage hole (circular hole or the like) penetrating the first connection block 23 in the thickness direction as shown in FIG. 3.

The first connection block 23 is brazed and fixed to the side end of the upper tanks 15b and 18b at the left end side in FIGS. 2 and 3, such that the branch passage 16 of the first connection block 23 is connected to an end of the capillary tube 17a. The inlet of the capillary tube 17a is positioned in the branch passage 16 at a position that is downstream from the inlet side of the nozzle part 14a in the main passage 25a.

The second connection block 24 is located in the upper tank 18b about at a center portion in a tank longitudinal direction to be brazed to an inner wall of the upper tank 18b. Therefore, the inside space of the upper tank 18b is separated into a left space 27 and a right space 28 in the tank longitudinal direction.

The capillary tube 17a is disposed within the upper tank 18b to penetrate through the second connection block 24. That is, the downstream side end of the capillary tube 17a is opened within the right space 28 of the upper tank 18b, penetrating a support hole 24a of the second connection block 24, as shown in FIG. 3. The outer peripheral surface of the capillary tube 17a and an inner wall surface of the support hole 24a are sealed by brazing, so that both the left and right spaces 27, 28 are separated from each other.

The nozzle part 14a of the ejector 14 is made of a stainless metal such as copper, and the other parts of the ejector 14 except for the nozzle part 14a, such as the mixer 14c and the diffuser 14d, are made of a metal material such as aluminum, for example. However, the other parts of the ejector 14 except for the nozzle part 14a, such as the mixer 14c and the diffuser 14d, may be made of resin (non-metal material). After a step of integrally brazing the first and second evaporators 15 and 18 or the like to form a heat exchanger structure, the ejector 14 is inserted into the upper tank 18b through a hole portion including the refrigerant inlet 25 and the main passage 25a of the first connection block 23. Thus, in this embodiment, an ejector inserting hole portion is formed by the refrigerant inlet 25 and the main passage 25a of the first connection block 23.

The tip end of the ejector 14 in the longitudinal direction shown in FIG. 3 corresponds to the outlet part 14e of the ejector 14 shown in FIG. 1. This ejector tip end is inserted into the cylindrical recess part 24b of the second connection block 24 to be air-tightly fixed using an O-ring 29a. The ejector tip end communicates with a communication hole portion 24c of the second connection block 24.

As shown in FIG. 3, at a substantial center of the inside space of the upper tank 15b of the first evaporator 15 in the tank longitudinal direction, is disposed a left and right partition plate 30, which partitions the inside space of the upper tank 15b into two spaces in the tank longitudinal direction, that is, the left space 31 and a right space 32.

The left space 31 serves as the collecting tank for collecting the refrigerants having passed through the plurality of tubes 21 of the first evaporator 15. The right space 32 serves as the distribution tank for distributing the refrigerant to the plurality of tubes 21 of the first evaporator 15.

The communication hole portion 24c of the second connection block 24 communicates with the right space 32 of the upper tank 15b of the first evaporator 15 through a through hole 33a of an intermediate wall 33 of the upper tanks 15b, 18b. The intermediate wall 33 is a wall member for defining and forming the upper tanks 15b, 18b.

The left end of the ejector 14 (left end of FIG. 3) in the tank longitudinal direction corresponds to the inlet part of the nozzle part 14a of FIG. 1. This left end is fitted into and air-tightly fixed to the inner peripheral surface of the main passage 25a using an O-ring 29b.

The fixing of the ejector 14 in its longitudinal direction can be performed using a fixing member such as a screw. The O-ring 29a can be held in a groove portion of the second connection block 24, and the O-ring 29b can be held in a groove portion of the first connection block 23.

The first connection block 23 is connected and brazed to the side walls of the upper tanks 15b, 18b, such that: the refrigerant outlet 26 of the first connection block 23 communicates with the left space 31 of the upper tank 15b of the first evaporator 15; the main passage 25a of the first connection block 23 communicates with the left space 27 of the upper tank 18b of the second evaporator 18; and the branch passage 16 of the first connection block 23 communicates with the one end portion of the capillary tube 17a. Furthermore, the refrigerant suction port 14b of the ejector 14 is communicated with the left space 27 of the upper tank 18b of the second evaporator 18.

In this embodiment, the second connection block 24 partitions the inside space of the upper tank 18b of the second evaporator 18 into the left and right spaces 27 and 28. The left space 27 serves as the collecting tank for collecting the refrigerant having passed through the plurality of tubes 21 of the second evaporator 18. The right space 28 serves as the distribution tank for distributing the refrigerant to the plurality of tubes 21 of the second evaporator 18. The ejector 14 is formed into a thin cylindrical shape elongated in the axial direction of the nozzle part 14a. The ejector 14 is located in parallel with the upper tank 18b of the ejector 14, such that the elongated direction of the cylindrical shape of the ejector 14 corresponds to the longitudinal direction of the upper tank 18b. With this structure, the ejector 14 and the second evaporator 18 can be arranged in compact, thereby reducing the size of the integrated unit 20.

Furthermore, the ejector 14 is located in the left space 27 used as the collection tank in the second evaporator 18, and the refrigerant suction port 14b is directly opened in the left space 27 used as the collection tank. That is, a refrigerant collection for collecting refrigerant from the tubes 21 and a refrigerant supply to the suction port 14b of the ejector 14 are performed using a single tank. Therefore, the refrigerant cycle device can effectively reduce the numbers of refrigerant pipes.

In addition, the first evaporator 15 and the second evaporator 18 are located adjacent to each other, and the downstream end portion of the ejector 14 is located adjacent to the right space 32 (distribution tank) of the upper tank 15b of the first evaporator 15. Accordingly, even when the ejector 14 is located inside the tank 18b of the second evaporator 18, the refrigerant flowing out of the ejector 14 can be easily supplied to the first evaporator 15 using a simple refrigerant passage (e.g., the communication holes 24c, 33a).

Next, the refrigerant passages in the whole integrated unit 20 will be described with reference to FIGS. 2 and 3.

The refrigerant inlet 25 of the first connection block 23 is branched into the main passage 25a and the branch passage 16. The refrigerant in the main passage 25a of the first connection block 23 passes through the ejector 14 (the nozzle part 14a→the mixer 14c→the diffuser 14d) and is decompressed. The decompressed low-pressure refrigerant from the ejector 14 flows into the right space 32 of the upper tank 15b of the first evaporator 15, via the communication hole 24c of the second connection block 24 and the through hole 33a of the intermediate wall, as in the direction of the arrow "a".

The refrigerant in the right space 32 moves downward in the tubes 21 positioned on the right side of the heat exchange core 15a in the direction of the arrow "b" to flow into the right side part of the lower tank 15c. Within the lower tank 15c, a partition plate is not provided, and thus the refrigerant moves from the right side of the lower tank 15c to the left side thereof in the direction of the arrow "c".

The refrigerant on the left side of the lower tank 15c moves upward in the tubes 21 positioned on the left side of the heat exchange core 15a in the direction of the arrow "d" to flow into the left space 31 of the upper tank 15b. The refrigerant further flows to the refrigerant outlet 26 of the first connection block 23 in the direction of the arrow "e".

In contrast, the refrigerant on the branch passage 16 of the first connection block 23 is first decompressed through the capillary tube 17a, and then the decompressed low-pressure refrigerant (liquid-vapor two-phase refrigerant) flows into the right space 28 of the upper tank 18b of the second evaporator 18 in the direction of the arrow "f".

The refrigerant flowing into the right space 28 of the upper tank 18b of the second evaporator 18 moves downward in the tubes 21 positioned on the right side of the heat exchange core 18a in the direction of the arrow "g" to flow into the right side part of the lower tank 18c. Within the lower tank 18c, a right and left partition plate is not provided, and thus the refrigerant moves from the right side of the lower tank 18*c* to the left side thereof in the direction of an arrow "h".

The refrigerant on the left side of the lower tank 18*c* moves upward in the tubes 21 positioned on the left side of the heat exchange core 18*a* in the direction of the arrow "i" to flow into the left space 27 of the upper tank 18*b*. Since the refrigerant suction port 14*b* of the ejector 14 is in communication with the left space 27, the refrigerant in the left space 27 is sucked from the refrigerant suction port 14*b* into the ejector 14.

The integrated unit 20 has the structure of the refrigerant passage as described above. Only the single refrigerant inlet 25 can be provided in the first connection block 23, and only the single refrigerant outlet 26 can be provided in the first connection block 23 in the integrated unit 20 as a whole.

Now, an operation of the first embodiment will be described. When the compressor 11 is driven by a vehicle engine, the high-temperature and high-pressure refrigerant compressed by and discharged from the compressor 11 flows into the radiator 12, where the high-temperature refrigerant is cooled and condensed by the outside air. The high-pressure refrigerant flowing from the radiator 12 flows into the liquid receiver 12*a*, within which the refrigerant is separated into liquid and vapor phases. The liquid refrigerant is derived from the liquid receiver 12*a* and passes through the expansion valve 13.

The expansion valve 13 adjusts the degree of opening of the valve (refrigerant flow rate) such that the superheat degree of the refrigerant at the outlet of the first evaporator 15 (i.e., sucked refrigerant by the compressor) becomes a predetermined value, and the high-pressure refrigerant is decompressed. The refrigerant having passed through the expansion valve 13 (middle pressure refrigerant) flows into the refrigerant inlet 25 provided in the first connection block 23 of the integrated unit 20.

At that time, the refrigerant flow is divided into the refrigerant flow directed from the main passage 25*a* of the first connection block 23 to the nozzle part 14*a* the ejector 14, and the refrigerant flow directed from the refrigerant branch passage 16 of the first connection block 23 to the capillary tube 17*a*.

The refrigerant flow into the ejector 14 is decompressed and expanded by the nozzle part 14*a*. Thus, the pressure energy of the refrigerant is converted into the speed energy at the nozzle part 14*a*, and the refrigerant is ejected from the jet port of the nozzle part 14*a* at high speed. At this time, the pressure drop of the refrigerant sucks from the refrigerant suction port 14*b*, the refrigerant (vapor-phase refrigerant) having passed through the second evaporator 18 on the branch refrigerant passage 16.

The refrigerant ejected from the nozzle part 14*a* and the refrigerant sucked into the refrigerant suction port 14*b* are combined by the mixer 14*c* on the downstream side of the nozzle part 14*a* to flow into the diffuser 14*d*. In the diffuser 14*d*, the speed (expansion) energy of the refrigerant is converted into the pressure energy by enlarging the path area, resulting in increased pressure of the refrigerant.

Figure 12:
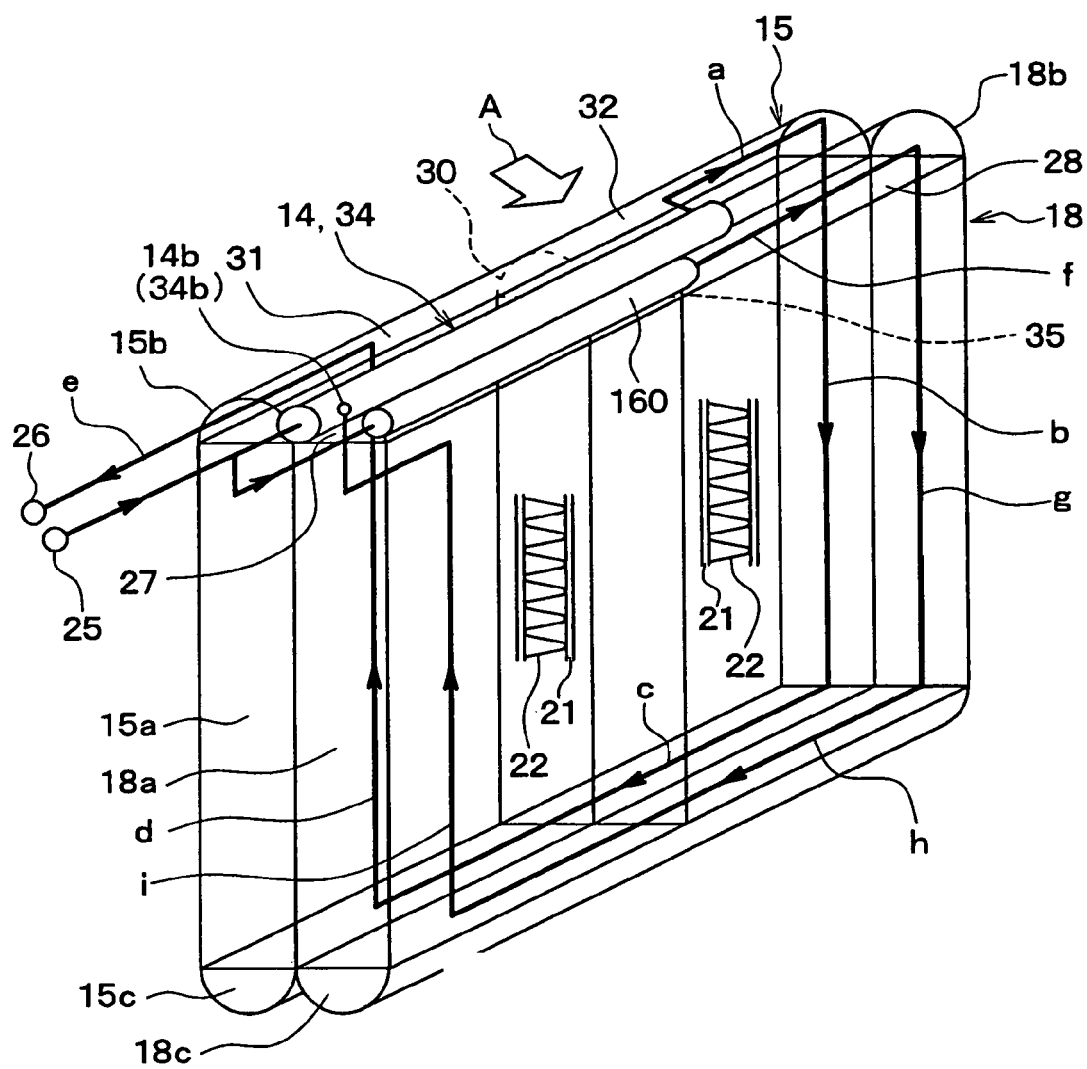
FIG. 12 is a perspective view showing a schematic structure of an integrated unit according to a fourth embodiment of the present invention.

The refrigerant flowing from the diffuser 14*d* of the ejector 14 flows through the refrigerant flow paths indicated by the arrows "a" to "e" in FIG. 12 in the first evaporator 15. During this time, in the heat exchange core 15*a* of the first evaporator 15, the low-temperature and low-pressure refrigerant absorbs heat from the blown air in the direction of an arrow "A" so as to be evaporated. The vapor-phase refrigerant evaporated is sucked from the single refrigerant outlet 26 into the compressor 11, and compressed again.

The refrigerant flow into the refrigerant branch passage 16 is decompressed by the capillary tube 17*a* to become a low-pressure refrigerant (liquid-vapor two-phase refrigerant). The low-pressure refrigerant flows through the refrigerant flow paths indicated by the arrows "f" to "i" of FIG. 2 in the second evaporator 18. During this time, in the heat exchange core 18*a* of the second evaporator 18, the low-temperature and low-pressure refrigerant absorbs heat from the blown air having passed through the first evaporator 15 to be evaporated. The vapor-phase refrigerant evaporated is sucked from the refrigerant suction port 14*b* into the ejector 14.

As described above, according to the embodiment, the refrigerant on the downstream side of the diffuser 14*d* of the ejector 14 can be supplied to the first evaporator 15, and the refrigerant on the branch path 16 side can be supplied to the second evaporator 18 via a capillary tube (throttle) 17*a*, so that the first and second evaporators 15 and 18 can exhibit cooling effects at the same time. Thus, the cooled air by both the first and second evaporators 15 and 18 can be blown into a space to be cooled, thereby cooling the space to be cooled.

At that time, the refrigerant evaporation pressure of the first evaporator 15 is the pressure of the refrigerant which has been increased by the diffuser 14*d*. In contrast, since the outlet side of the second evaporator 18 is connected to the refrigerant suction port 14*b* of the ejector 14, the lowest pressure of the refrigerant which has been decompressed at the nozzle part 14*a* can act on the second evaporator 18.

Thus, the refrigerant evaporation pressure (refrigerant evaporation temperature) of the second evaporator 18 can be lower than the refrigerant evaporation pressure (refrigerant evaporation temperature) of the first evaporator 15. With respect to the direction of the flow A of the blown air, the first evaporator 15 whose refrigerant evaporation temperature is high is disposed on the upstream side, and the second evaporator 18 whose refrigerant evaporation temperature is low is disposed on the downstream side. Both a difference between the refrigerant evaporation temperature of the first evaporator 15 and the temperature of the blown air, and a difference between the refrigerant evaporation temperature of the second evaporator 18 and the temperature of the blown air can be secured.

Thus, both cooling performances of the first and second evaporators 15 and 18 can be exhibited effectively. Therefore, the cooling performance of the common space to be cooled can be improved effectively in the combination of the first and second evaporators 15 and 18. Furthermore, the effect of pressurization by the diffuser 14*d* increases the pressure of suction refrigerant of the compressor 11, thereby decreasing the driving power of the compressor 11.

The refrigerant flow rate on the second evaporator 18 side can be adjusted independently by the capillary tube (throttle) 17 without depending on the function of the ejector 14, and the refrigerant flow rate into the first evaporator 15 can be adjusted by a throttle characteristic of the ejector 14. Thus, the refrigerant flow rates into the first and second evaporators 15 and 18 can be adjusted readily, corresponding to the respective heat loads of the first and second evaporators 15 and 18.

For a small cycle heat load, the difference between high and low pressures in the cycle becomes small, and the input of the ejector 14 also becomes small. In the cycle as disclosed in JP-B2-3322263, the refrigerant flow rate passing through the second evaporator 18 depends on only the refrigerant suction ability of the ejector 14. This results in decreased input of the ejector 14, deterioration in the refrigerant suction ability of the ejector 14, and decrease in the refrigerant flow rate of the second evaporator 18 in order, making it difficult to secure the cooling performance of the second evaporator 18.

In contrast, in the embodiment, the refrigerant having passed through the expansion valve 13 is branched at the upstream part of the nozzle part 14a of the ejector 14, and the branched refrigerant is sucked into the refrigerant suction port 14b through the refrigerant branch passage 16, so that the refrigerant branch passage 16 is in a parallel connection relation to the ejector 14.

Thus, the refrigerant can be supplied to the refrigerant branch passage 16, using not only the refrigerant suction ability of the ejector 14, but also the refrigerant suction and discharge abilities of the compressor 11. This can reduce the degree of decrease in the refrigerant flow rate on the second evaporator side 18 as compared with in the cycle disclosed in the patent document 1, even in the occurrence of phenomena, including decrease in input of the ejector 14, and deterioration in the refrigerant suction ability of the ejector 14. Accordingly, even under the condition of the low heat load, the cooling performance of the second evaporator 18 can be secured readily.

Figure 5:
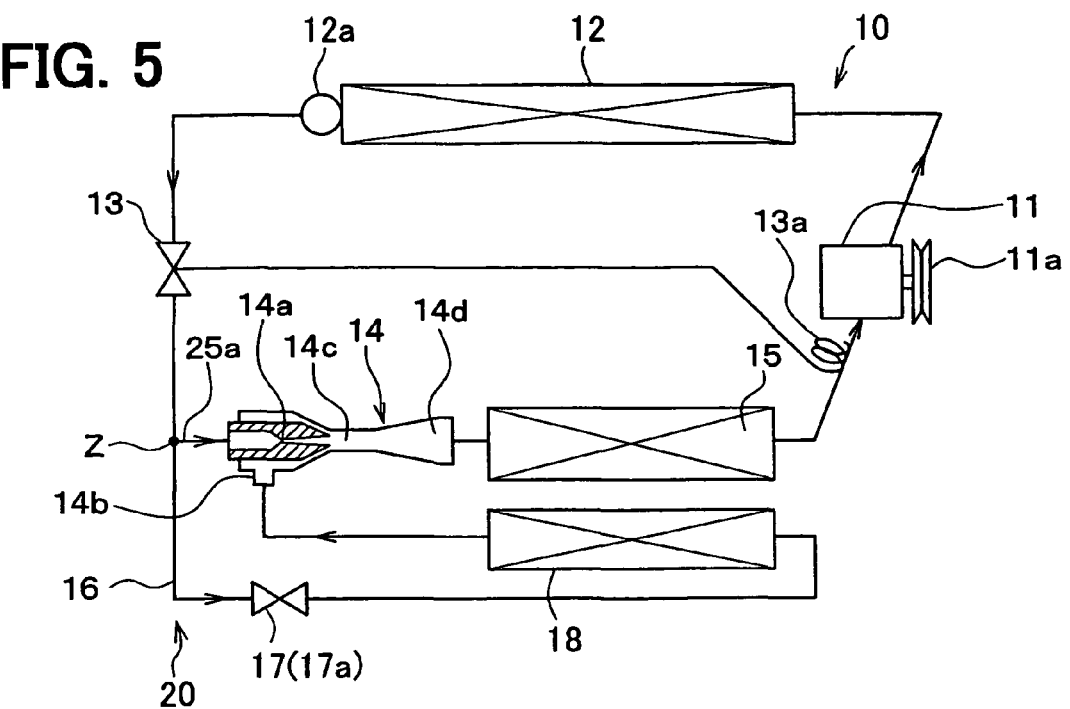
FIG. 5 is a refrigerant circuit diagram of an ejector refrigerant cycle device for a vehicle according to a comparison example of the first embodiment.

FIG. 5 shows a comparison example of the first embodiment, in which the ejector 14, the first evaporator 15, the second evaporator 18 and the throttle 17 (capillary tube 17a as the fixed throttle) are respectively separately formed and are independently fixed to a vehicle body using piping. In this case, connection pipes connected to the inlet side and the outlet side of the ejector 14, connection pipes connected to the inlet side and the outlet side of the throttle 17, a connection pipe for connecting the outlet side of the second evaporator 18 and the refrigerant suction port 14b, etc are required additionally, as compared with the integrated unit 20 of the first embodiment. As a result, piping structure of the ejector refrigerant cycle device becomes complex, and mounting performance of the ejector refrigerant cycle device 10 is deteriorated.

In contrast, according to the first embodiment, the ejector 14, the first and second evaporators 15, 18 and the capillary tube 17a are assembled as a single unit structure, that is, the integrated unit 20, and the integrated unit 20 is provided with the single refrigerant inlet 25 and the refrigerant outlet 26. As a result, when the ejector refrigerant cycle device 10 is mounted in the vehicle, the integrated unit 20 provided with the various components (14, 15, 18, 17a) is connected as the whole such that the single refrigerant inlet 25 is connected to the refrigerant outlet side of the expansion valve 13 and the single refrigerant outlet 26 is connected to the refrigerant suction side of the compressor 11.

Furthermore, because the ejector 14 and the capillary tube 17a are located within the tank part (evaporator tank part) of the first and second evaporators 15, 18, the size of the integrated unit 20 can be made smaller and simple, thereby improving the mounting space of the integrated unit 20. As a result, in the first embodiment, the mounting performance of the ejector refrigerant cycle device in the vehicle can be improved, and the connection passage length for connecting the ejector 14, the capillary tube 17a and the first and second evaporators 15, 18 can be effectively reduced, as compared with the comparison example of FIG. 5. Because the connection passage length for connecting the ejector 14, the capillary tube 17a and the first and second evaporators 15, 18 is made minimum in the integrated unit 20, pressure loss in the refrigerant passage can be reduced, and heat exchanging amount of the low-pressure refrigerant in the integrated unit 20 with its atmosphere can be reduced. Accordingly, the cooling performance of the first and second evaporators 15, 18 can be effectively improved.

Because the refrigerant outlet side of the second evaporator 18 is connected to the refrigerant suction port 14b of the ejector 14 without using a pipe, the evaporation pressure of the second evaporator 18 can be made lower by a pressure due to the pipe-caused pressure loss, thereby the cooling performance of the second evaporator 18 can be improved without increasing the compressor-consumed power.

Furthermore, because the ejector 14 is located in the evaporator tank part having a low-temperature condition, it is unnecessary to attach a heat insulating member to the ejector 14.

Second Embodiment

Figure 6:
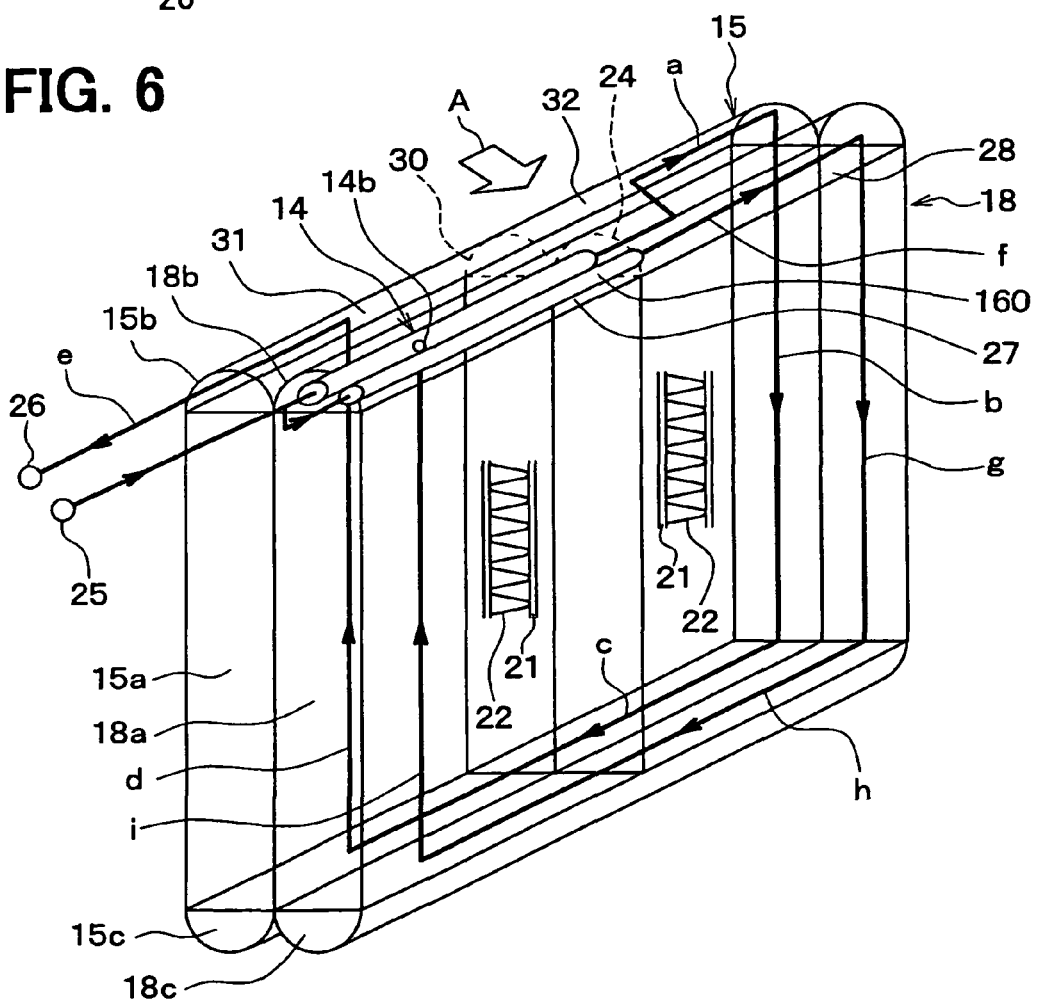
FIG. 6 is a perspective view showing a schematic structure of an integrated unit according to a second embodiment of the present invention.
Figure 7:
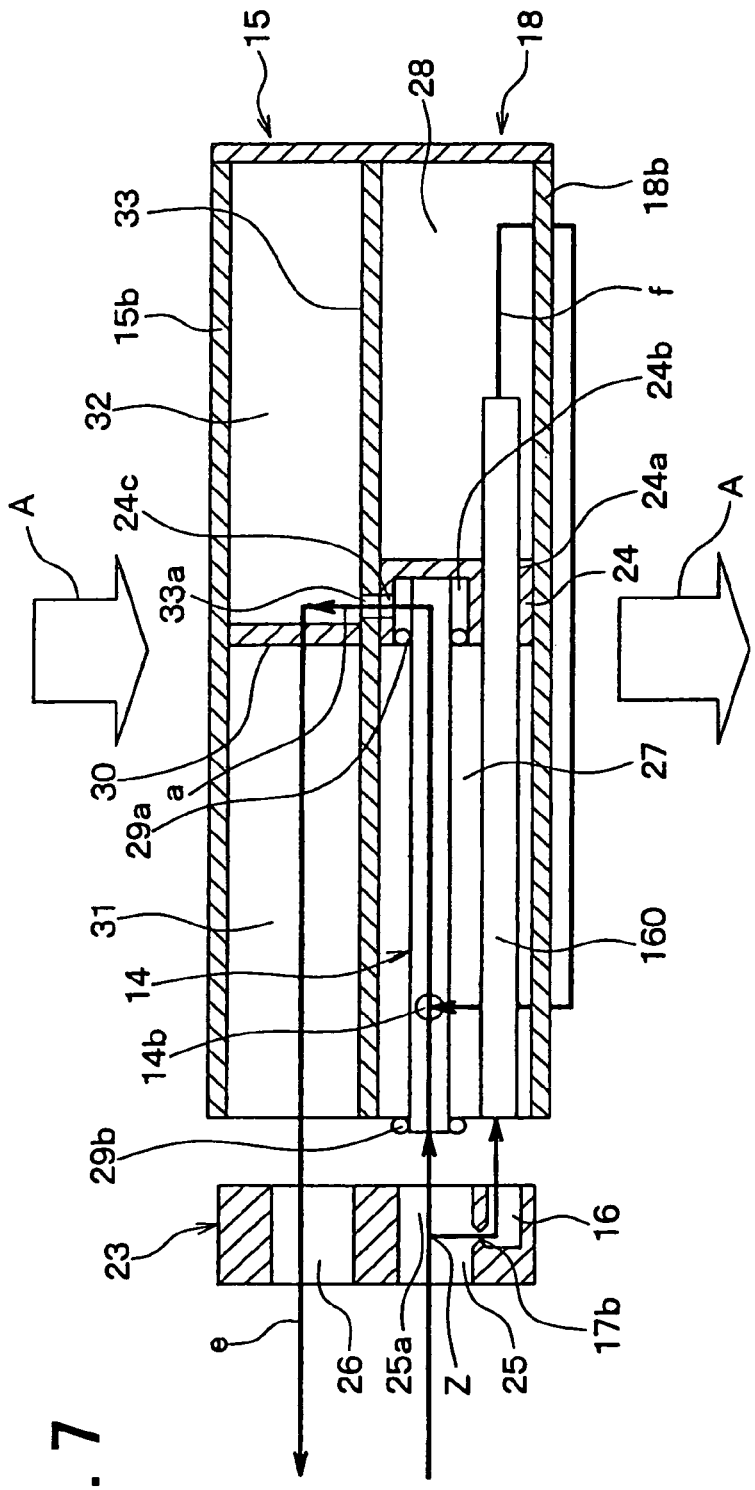
FIG. 7 is a longitudinal sectional view of an evaporator tank in the integrated unit of FIG. 6.
Figure 8:
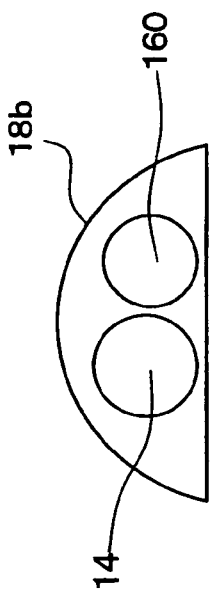
FIG. 8 is a schematic cross-sectional view of the evaporator tank of the integrated unit of FIG. 6.

In the above-described first embodiment, the capillary tube 17a is disposed between the branch passage 16 of the first connection block 23 of the integrated unit 20 and the refrigerant inlet side of the second evaporator 18, so that the refrigerant from the refrigerant inlet of the second evaporator 18 is decompressed by the capillary tube 17a. However, in the second embodiment, the capillary tube 17a is not employed as the decompression means of the second evaporator 18 as shown in FIGS. 6 to 8, and instead, a fixed throttle hole 17b, such as an orifice, for restricting a path area to a predetermined level is provided on the branch passage 16 of the first connection block 23. Together with this, in the second embodiment, a connection pipe 160 whose passage diameter is larger than that of the capillary tube 17a is disposed at the position of the capillary tube 17a of the first embodiment.

An integrated unit 2 of the second embodiment has the same refrigerant passages as those of the first embodiment, except only that the low-pressure refrigerant decompressed by the fixed throttle hole 17b formed on the branch passage 16 of the first connection block 23 is introduced into the right space 28 of an upper tank 18b of the second evaporator 18 through the connection pipe 160. Thus, the adoption of the integrated unit 20 of the second embodiment can exhibit the same operation and effect as those of the first embodiment.

Third Embodiment

Figure 9:
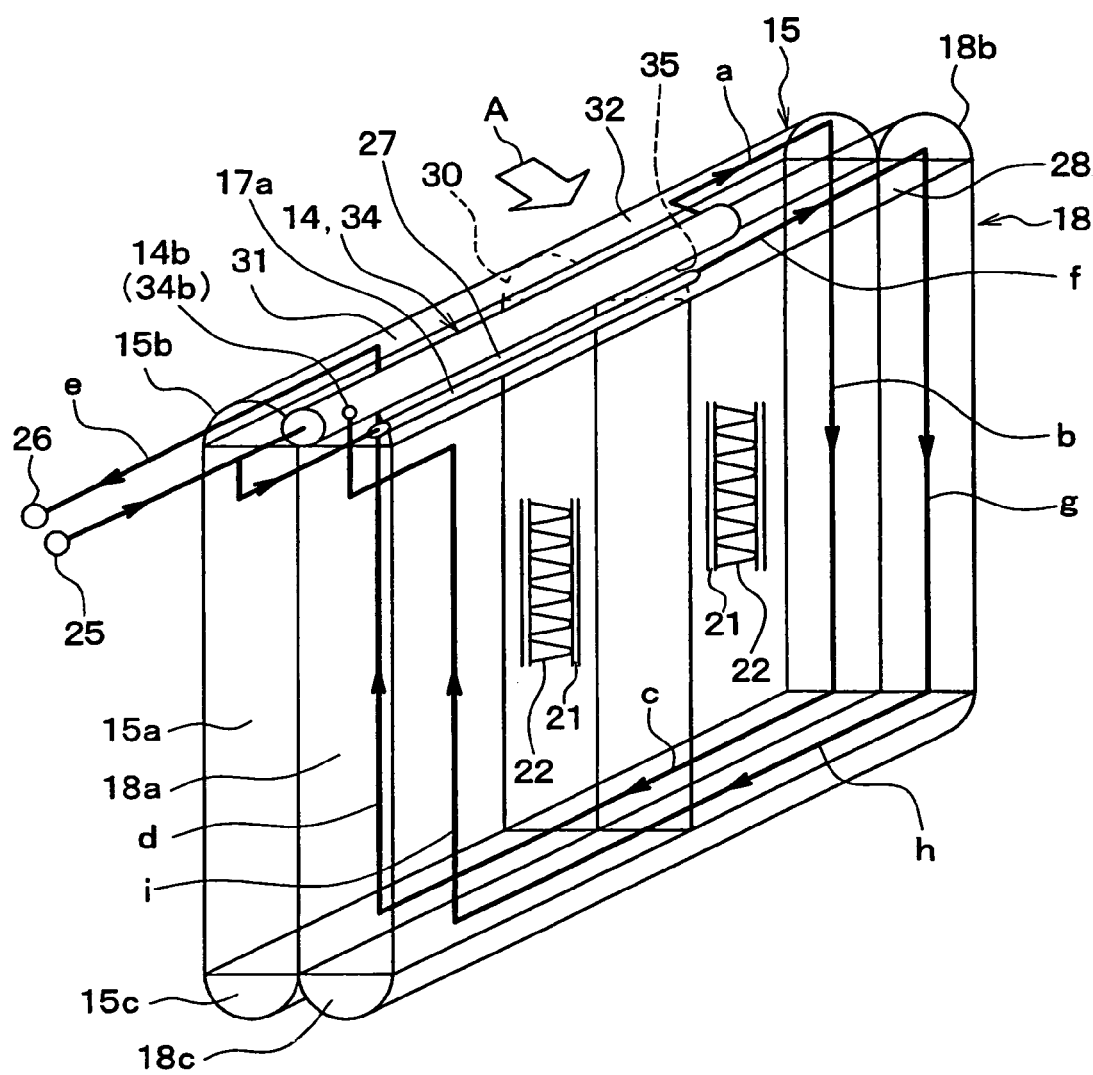
FIG. 9 is a perspective view showing a schematic structure of an integrated unit according to a third embodiment of the present invention.

Although in the above-described first embodiment, the ejector 14 and the capillary tube 17a are located in a common tank, that is, in the upper tank 18b of the second evaporator 18, in a third embodiment, as shown in FIGS. 9 to 11, only the capillary tube 17a is disposed in the upper tank 18b of the second evaporator 18, while the ejector 14 is disposed in another dedicated tank space 34.

In the third embodiment, together with removing the ejector 14 from the inside of the upper tank 18b of the second evaporator 18, the second connection block 24 employed in the first embodiment is withdrawn. Instead, a partition plate 35 is disposed approximately in the center part of the upper tank 18b in the tank longitudinal direction, and is adapted to partition the inside space of the upper tank 18b into a left space 27 and a right space 28. The tip end of the capillary tube 17a is adapted to penetrate the partition plate 35 so as to communicate with the right space 28 of the upper tank 18b.

The above-described another tank space 34 constitutes a dedicated space for insertion of the ejector 14, and is disposed in the intermediate position between the upper tank 15b of the first evaporator 15 and the upper tank 18b of the second evaporator 18 as shown in FIG. 11. The tank space 34 has a cylindrical shape extending in the longitudinal direction of both the tanks 15b and 18b. This dedicated tank space 34 has its wall surface integrally formed with the upper tanks 15b and 18b.

The ejector 14 and the cylindrical dedicated tank space 34 extend up to the refrigerant downstream side (right side) away from the partition plates 30 and 35 for both the tanks 15b and 18b, as shown in FIG. 10. The outlet part of the ejector 14

(outlet part of the diffuser 14d) communicates with the right space 32 which serves as the distribution tank of the upper tank 15b of the first evaporator 15 through a through hole (lateral hole) 34a, which penetrates the circumferential wall of the dedicated tank space 34.

Similarly, the refrigerant inlet port 14b of the ejector 14 also communicates with the left space 27 which serves as a collecting tank of the upper tank 18b of the second evaporator 18 through a through hole (lateral hole) 34b, which penetrates the circumferential wall of the dedicated tank space 34.

In the third embodiment, the other parts can be made similarly to those of the above-described first embodiment. In the third embodiment described above, in the integrated unit 20 including the ejector 14 disposed in the dedicated tank space 34, the same refrigerant flow path as that of the first embodiment can be obtained. This can exhibit the same operation and effect as those of the first embodiment.

Fourth Embodiment

The fourth embodiment is a modified one from the third embodiment, wherein the capillary tube 17a of the third embodiment is withdrawn, and instead, the fixed throttle hole 17b and the connection pipe 160 described in the second embodiment are also employed.

Figure 13:
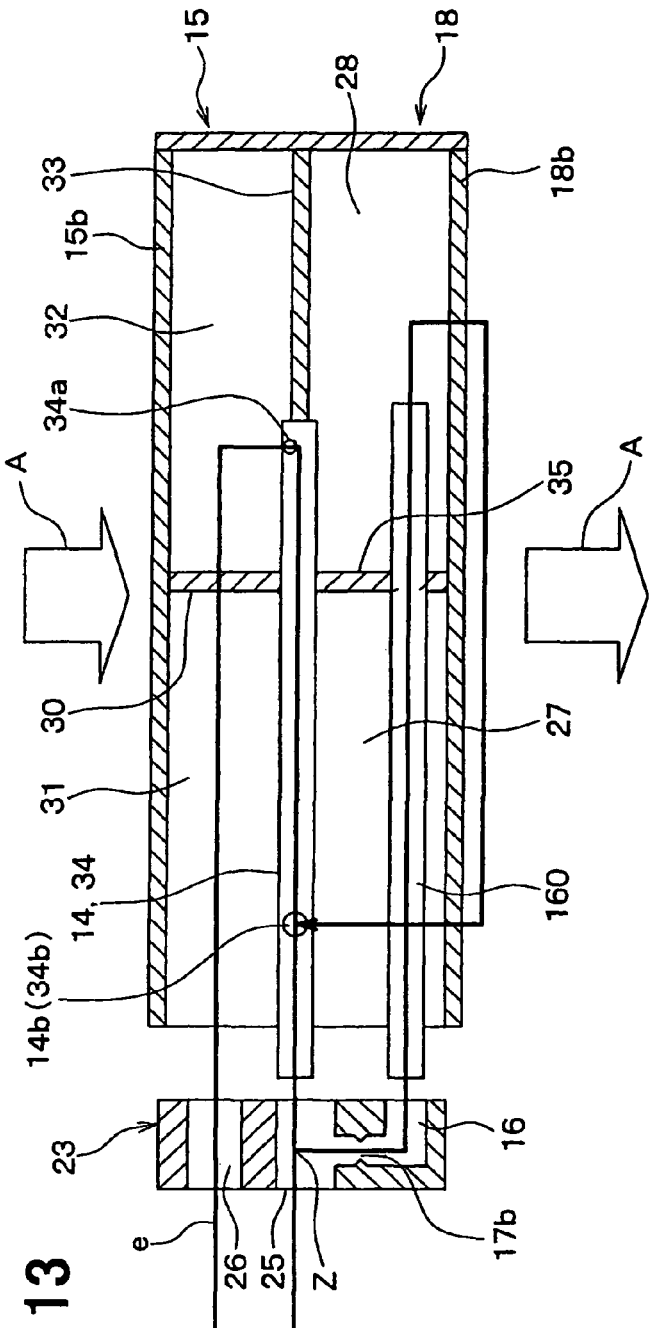
FIG. 13 is a longitudinal sectional view of an evaporator tank in the integrated unit of FIG. 12.
Figure 14:
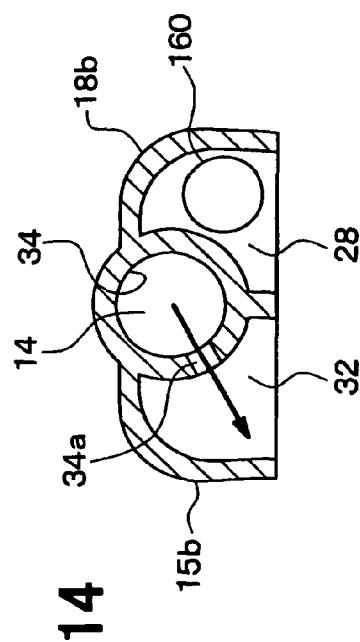
FIG. 14 is a schematic cross-sectional view of the evaporator tank of the integrated unit of FIG. 13.

That is, in the fourth embodiment, as shown in FIGS. 12 to 14, the fixed throttle hole 17b serving as the decompression means is formed on the branch passage 16 of the first connection block 23, and the downstream side of the fixed throttle hole 17b communicates with the right space 28 of the upper tank 18b of the second evaporator 18 through the connection pipe 160. In the fourth embodiment, the other parts can be made similarly to the those of the above-described first embodiment.

Fifth Embodiment

FIGS. 15 to 25 illustrate the fifth embodiment, which is obtained through various modifications to the incorporated structure including the ejector 14 and the capillary tube 17a, and the partition structure in the tank of the above-described first to fourth embodiments.

Figure 15:
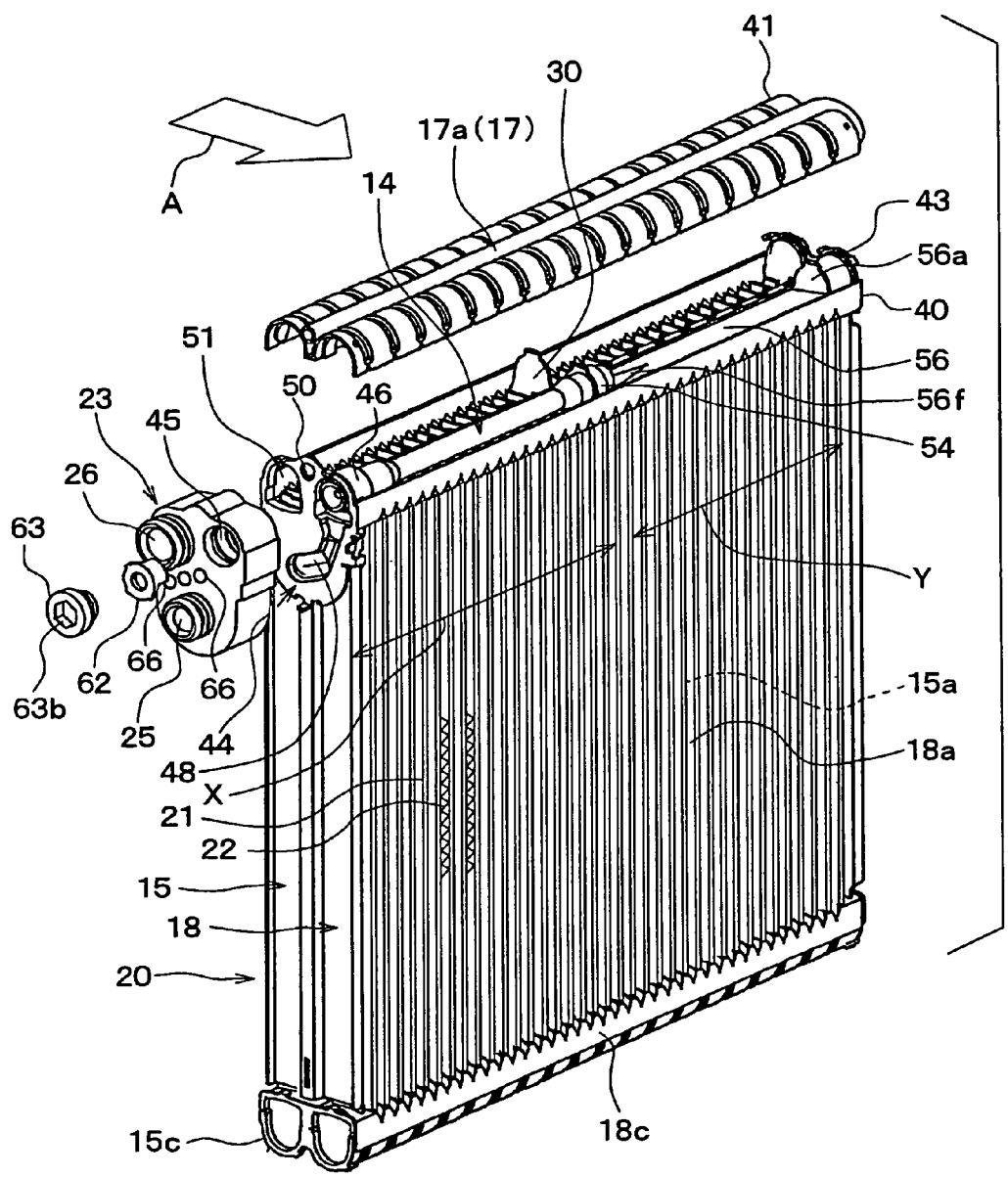
FIG. 15 is a disassembled perspective view showing a schematic structure of an integrated unit according to a fifth embodiment of the present invention.
Figure 16:
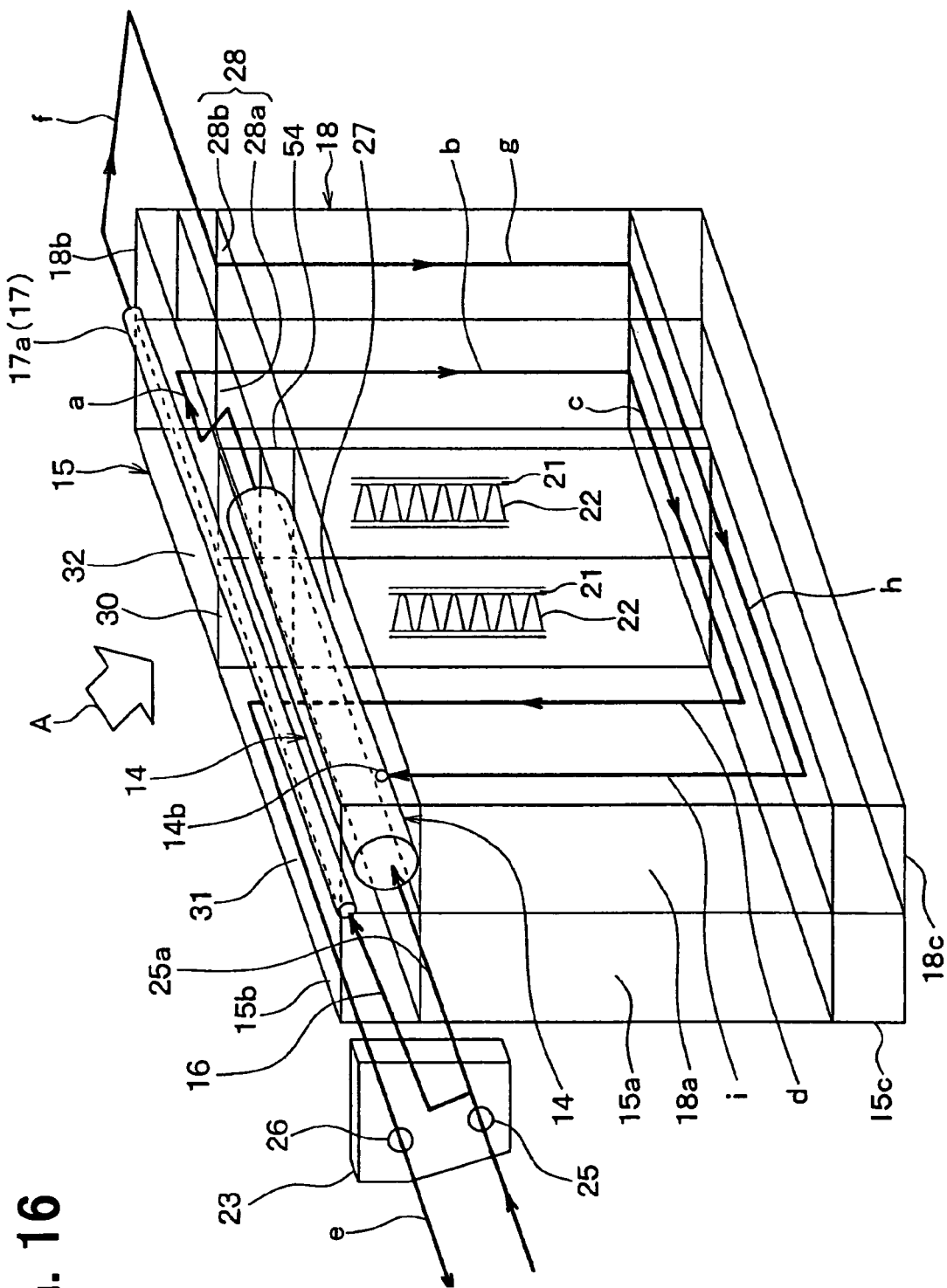
FIG. 16 is a perspective view showing a schematic structure of the integrated unit according to the fifth embodiment.
Figure 17:
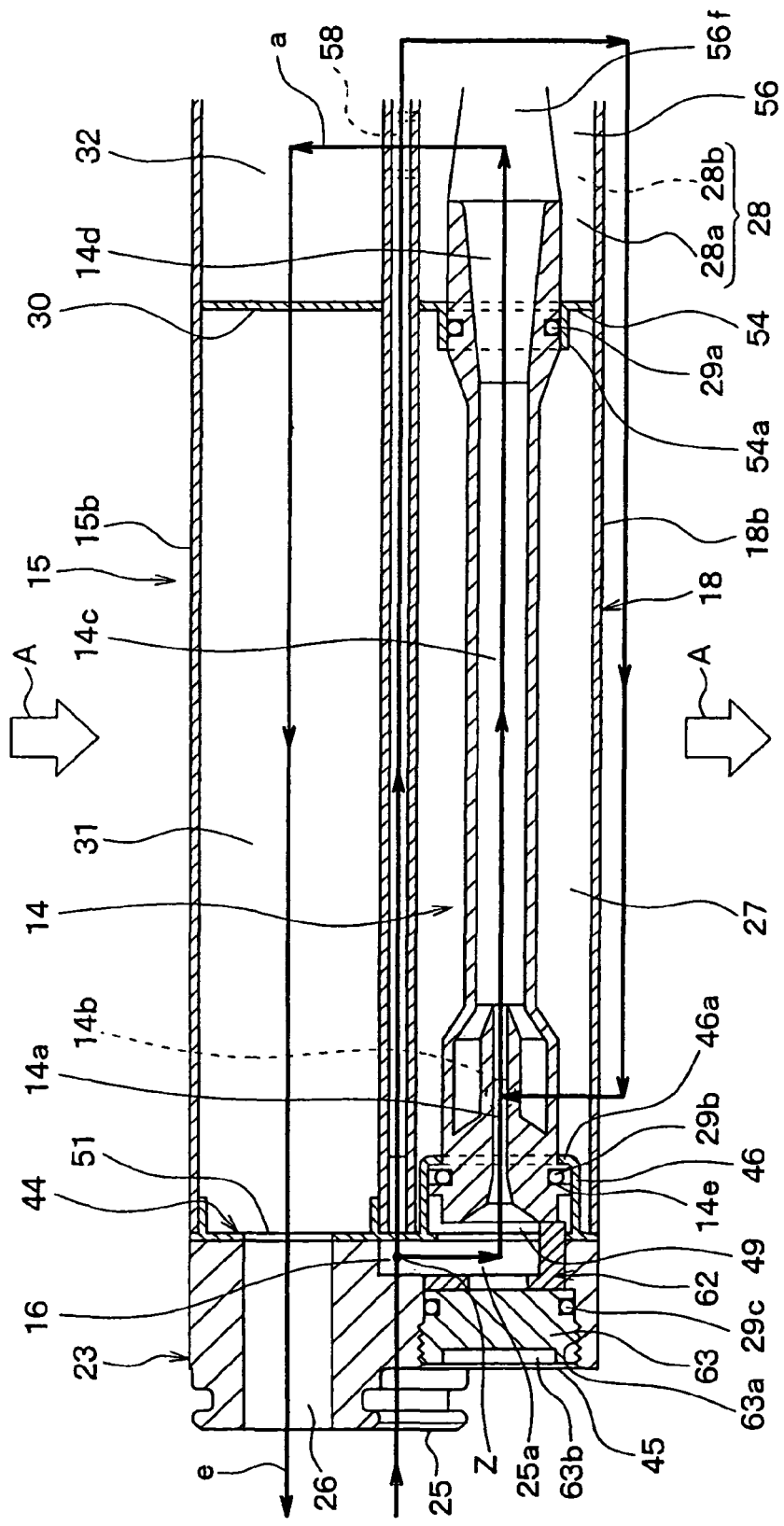
FIG. 17 is a schematic longitudinal sectional view showing a part of an evaporator tank of the integrated unit at a side of a connection block, according to the fifth embodiment.
Figure 18:
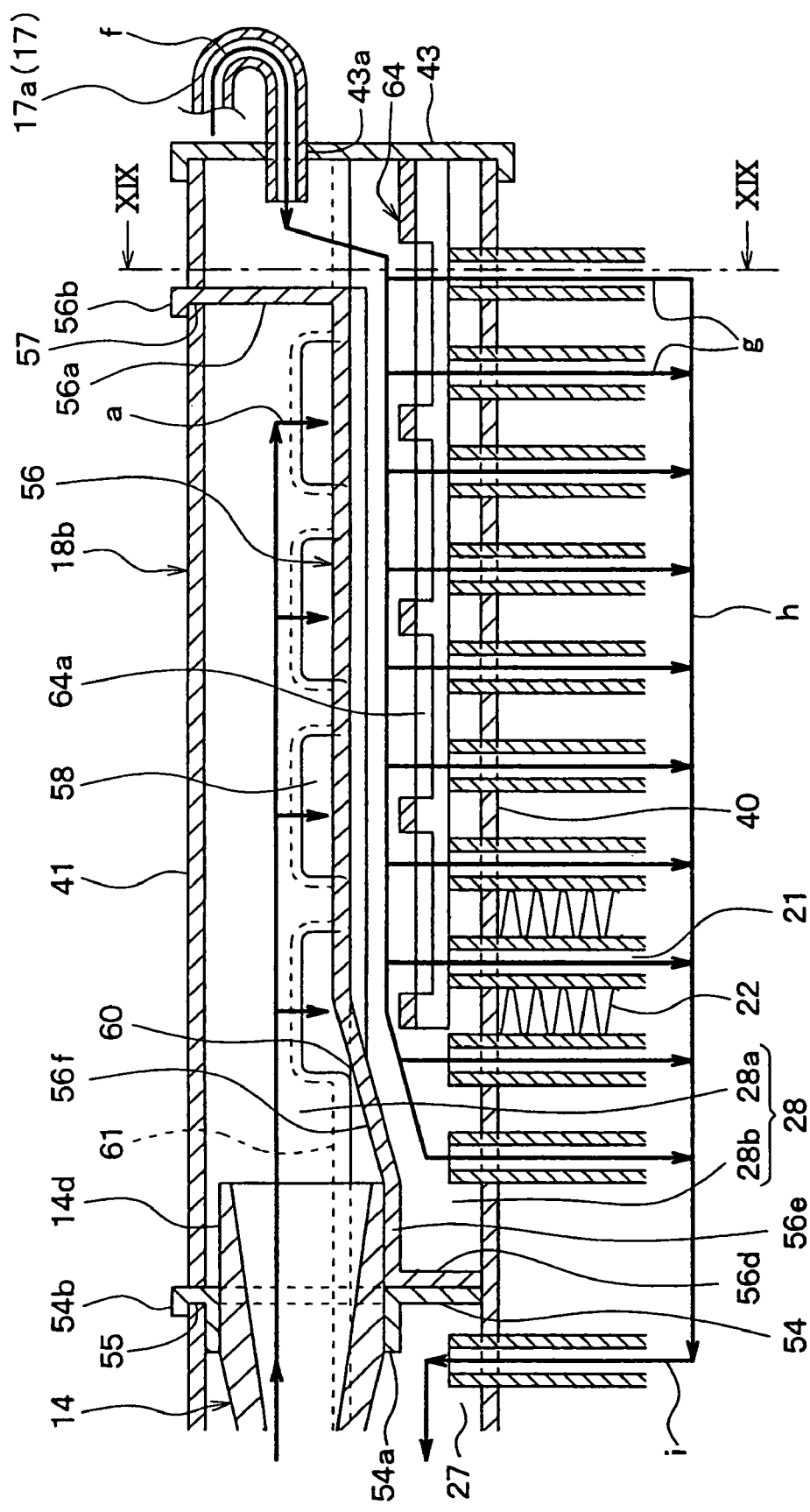
FIG. 18 is a schematic longitudinal sectional view showing a part of the evaporator tank of the integrated unit at a side opposite to the connection block, according to the fifth embodiment.
Figure 19:
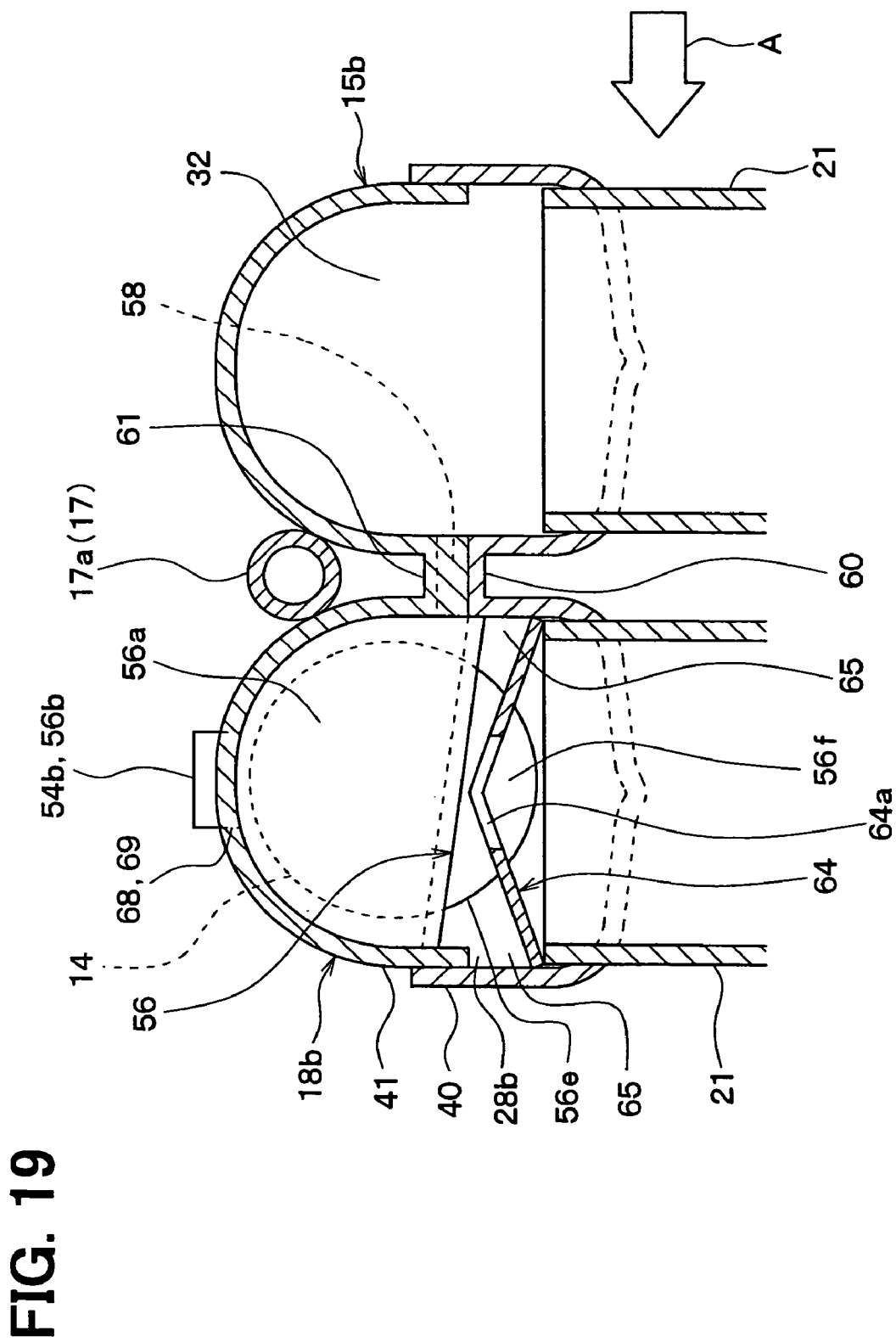
FIG. 19 is a cross-sectional view of the evaporator tank of the integrated unit taken along the line XIX-XIX in FIG. 18.

FIG. 15 is an exploded perspective view of the integrated unit 20 according to the fifth embodiment, FIG. 16 is a schematic perspective view showing the structure of a refrigerant passage of the integrated unit 20, FIG. 17 is a sectional view of a part of an evaporator upper tank on a side of the first connection block 23, FIG. 18 is a sectional view of a part opposite to the first connection block 23 in the evaporator upper tank, and FIG. 19 is a sectional view of the evaporator upper tank taken along the line XIX-XIX in FIG. 18.

In the fifth embodiment, as shown in FIGS. 15 and 19, the two upper tanks 15b and 18b are divided into a tube-side (bottom-side) half member 40 and a non-tube-side (upper-side) half member 41 which are extending in the longitudinal direction of the tank (in the direction of arrangement of the tubes), and these two half members 40 and 41 are incorporated integrally, so that two cylindrical shapes extending in the tank longitudinal direction (tube arrangement direction) are arranged backward and forward of the air flow direction A in parallel to each other. The side ends of the two cylindrical shapes in the tank longitudinal direction (e.g., right ends of FIG. 18) are closed with a cap 43. This constitutes two upper tanks 15b and 18b.

As shown in FIG. 19, the tube-side half member 40 has approximately a W-shaped section which is obtained by integrally forming respective tube-side half parts of the two upper tanks 15b and 18b. The non-tube-side half member 41 approximately has a M-shaped section which is obtained by integrally forming respective non-tube-side half parts of the two upper tanks 15b and 18b.

In the fifth embodiment, the capillary tube 17a is placed on a valley-like part formed in the center area of the substantially M-shaped section of the upper-side half member among the two upper tanks 15b and 18b, and the capillary tube 17a is integrally brazed to the outer surface of the upper tanks 15b and 18b as shown in FIG. 19.

The outlet side end (e.g., right end side in FIGS. 15 and 16) of the capillary tube 17a is inserted into a through hole 43a of the cap 43 which closes the other side of the upper tank 18b in the tank longitudinal direction, as illustrated in FIG. 18, and is opened in the right space 28 to communicate with the right space 28.

In the fifth embodiment, as shown in FIG. 17, an intervening plate 44 is disposed between the first connection block 23 and one side end of each of the upper tanks 15b and 18b in the tank longitudinal direction, and the first connection block 23 is integrally brazed to the side ends of the upper tanks 15b and 18b with the intervening plate 44 sandwiched therebetween.

Thus, the intervening plate 44 is also made of aluminum material, like the evaporator components, the capillary tube 17a, and the first connection block 23. The intervening plate 44 constitutes the refrigerant passage together with the first connection block 23, as described later, and serves to hold and fix one end of the ejector 14 in the tank longitudinal direction (one end of the nozzle part 14a).

Figure 20:
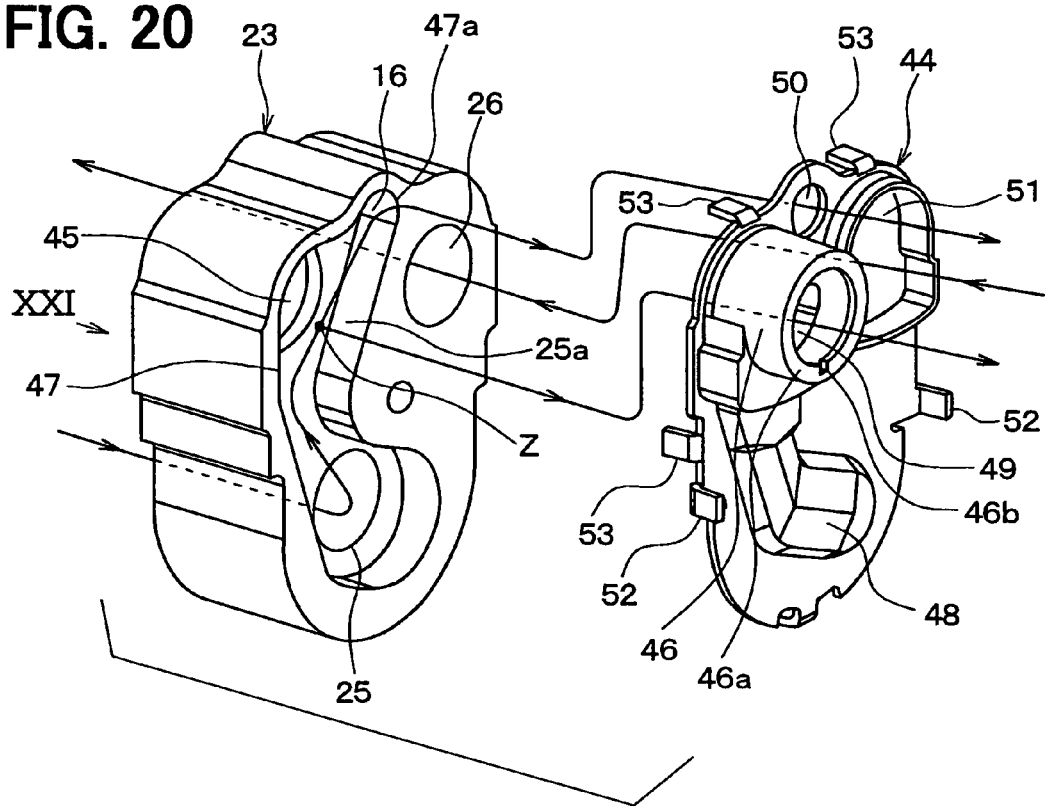
FIG. 20 is a schematic perspective view showing the connection block and an intervening plate of the integrated unit according to the fifth embodiment.
Figure 21:
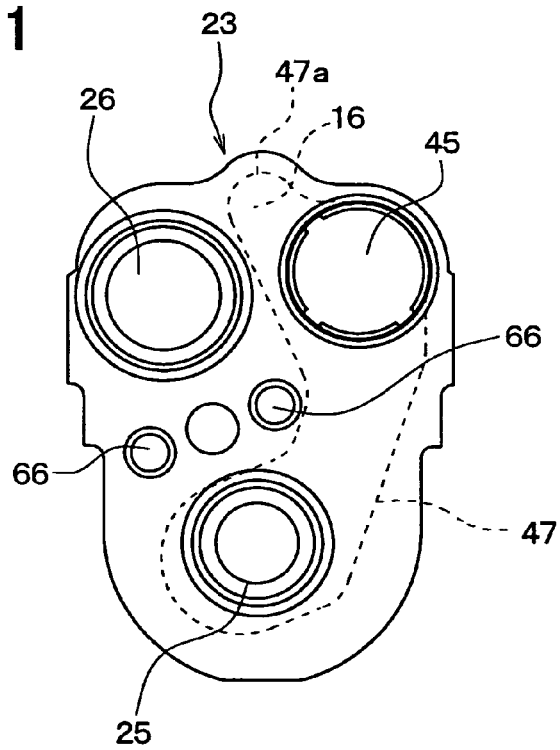
FIG. 21 is a side view of the connection block from the arrow XXI of FIG. 20.

In the first connection block 23 of the fifth embodiment, as shown in FIGS. 20 and 21, one refrigerant inlet 25 and one refrigerant outlet 26 of the integrated unit 20 are provided, and a dedicated hole portion 45 for insertion of the ejector 14 into the evaporator tank is provided.

The dedicated hole portion 45 for insertion of the ejector 14 has a circular shape, and is opened to be opposed to the side of the left tank space 27 in the upper tank 18b of the second evaporator 18. The left tank space 27 forms a tank space on the refrigerant collection side in the second evaporator 18.

In the intervening plate 44, a cylindrical part 46 concentrically opposed to the hole portion 45 is formed. As shown in FIGS. 17 and 20, this cylindrical part 46 protrudes from a plate-shaped base of the intervening plate 44 into the left tank space 27 of the upper tank 18b in a cylindrical manner, and has its protruding tip end integrally formed with a flange part 46a, which is bent toward the inner diameter in a ring shape.

The inner diameter of the flange part 46a can be set a little bit larger than the maximum outer diameter of the diffuser 14d of the tip end of the ejector 14, and the tip end of the ejector 14 can be inserted into the left tank space 27 of the upper tank 18b through the hole portion 45 of the first connection block 23, and the cylindrical part 46 of the intervening plate 44.

As shown in FIG. 17, on the outer peripheral surface of the inlet side end (nozzle part 14a side) in the longitudinal direction of the ejector 14, a groove 14e for attachment of an O-ring 29b is formed to protrude in the ring shape outward in the radial direction. The groove 14e is engaged with the flange part 46a of the tip end of the cylindrical part 46 of the intervening plate 44. That is, the engagement of the O-ring groove 14e with the flange part 46a of the intervening plate 44 can define the position of insertion of the ejector 14.

The O-ring 29b is elastically pressed against the inner peripheral surface of the cylindrical part 46, thereby sealing the inlet-side outer peripheral surface of the ejector 14, thus preventing the main passage 25a described above from directly communicating with the left tank space 27.

A groove 46b (see FIG. 20) is formed at a predetermined position of the flange part 46a in a circumferential direction. A protrusion (not shown) extending on the outer peripheral surface of the ejector 14 in the longitudinal direction is fitted into the groove 46b, thereby preventing the rotation of the ejector 14, thus enabling definition of an assembly position of the ejector 14 in the circumferential direction.

Referring to FIGS. 20 and 21, a recessed groove 47 which is bent into a V shape is formed on the side of the intervening plate 44 in the first connection block 23. The refrigerant inlet 25 communicates with the one end of the recessed groove 47. In the center near the other end of the recessed groove 47, the hole portion 45 communicates with the cylindrical part 46 of the intervening plate 44.

As shown in FIG. 20, the intervening plate 44 has a recessed groove 48 opposite to the recessed groove 47 of the first connection block 23. Combination of both recessed grooves 47 and 48 increases the cross-sectional area of the refrigerant passage. The recessed shape of the recessed groove 48 is shown in FIGS. 15 and 20, for example.

Among the refrigerant passage formed by the recessed groove 47 of the first connection block 23, a passage part directed to the cylindrical part 46 of the intervening plate 44 forms the main passage 25a. Thus, an opening of the inner side of the cylindrical part 46 constitutes a main-passage-side opening 49 (see FIG. 17) communicating with the main passage 25a.

Among the refrigerant passage formed by the recessed groove 47, a passage part of the other end 47a side away from the opposite position of the cylindrical part 46 forms the branch passage 16. On the other hand, a circular branch-passage-side opening 50 of the intervening plate 44 is opened at a part opposed to the branch passage 16 of the first connection block 23 to communicate with the branch passage 16.

The opening 50 is air-tightly connected to the inlet side end (left end of FIG. 15) of the capillary tube 17a with brazing. The outlet side end of the capillary tube 17a (right end of FIG. 15) is bent into a U shape to be inserted into the through hole 43a of the cap 43 which closes the other side of the upper tank 18b in the tank longitudinal direction as shown in FIG. 18, and is opened within the right space 28 of the upper tank 18b. Seal connection is formed between the outer peripheral surface of the capillary tube 17a and the through hole 43a of the cap 43 with brazing.

In the intervening plate 44, a refrigerant outlet side opening 51 is opened at a part opposed to the refrigerant outlet 26 of the first connection block 23, and to the side of the left space 31 of the upper tank 15b of the first evaporator 15. The left space 31 communicates with the refrigerant outlet 26 via the opening 51 of the intervening plate 44.

A plurality of first lugs 52 protruding from the intervening plate 44 toward the evaporators 15, 18 are caulked and fixed to the upper tanks 15b and 18b, so that the intervening plate 44 can be temporarily fixed to the evaporator side before being brazed. A plurality of second lugs 53 protruding from the intervening plate 44 toward the first connection block 23 are caulked and fixed to the first connection block 23, so that the first connection block 23 can be temporarily fixed to the evaporator side via the intervening plate 44 before being brazed.

An ejector fixing plate 54 is a member corresponding to the second connection block 24 of the first embodiment. The ejector fixing plate 54 is disposed in a substantial center of the tank longitudinal direction of the inside space of the upper tank 18b of the second evaporator 18, and is brazed to the inner wall surface of the upper tank 18b.

Figure 22:
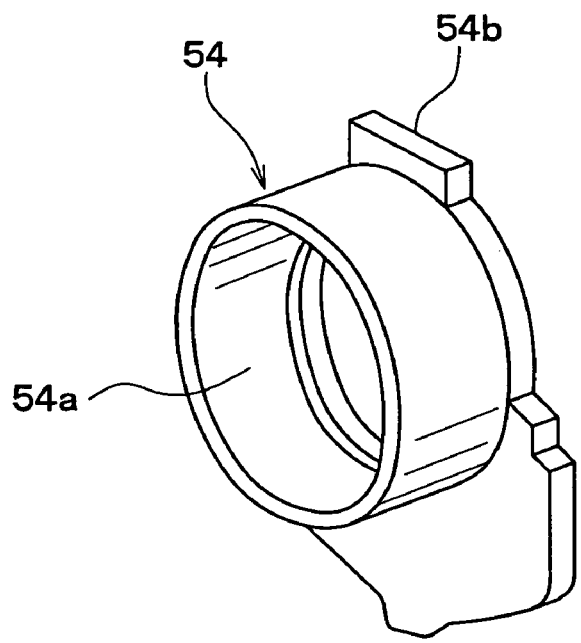
FIG. 22 is a perspective view showing an ejector fixing plate of the integrated unit according to the fifth embodiment.

The ejector fixing plate 54 has a cylindrical part 54a integrally formed as shown in FIGS. 17, 18, and 22. The ejector fixing plate 54 serves to fit and fix the diffuser 14d of the ejector 14 to the inner periphery of the cylindrical part 54a, while partitioning the inside space of the upper tank 18b into the left space 27 and the right space 28. The fitted part between the cylindrical part 54a and the diffuser 14d is sealed with an O-ring 29a (see FIG. 17).

A lug 54b (claw part, see FIG. 22) protruding from the ejector fixing plate 54 upward penetrates a slit-like hole 55 (see FIG. 18) on the upper surface of the upper tank 18b, and is caulked and fixed to the upper tank 18b. This can temporarily fix the ejector fixing plate 54 to the upper tank 18b before brazing.

Figure 24:
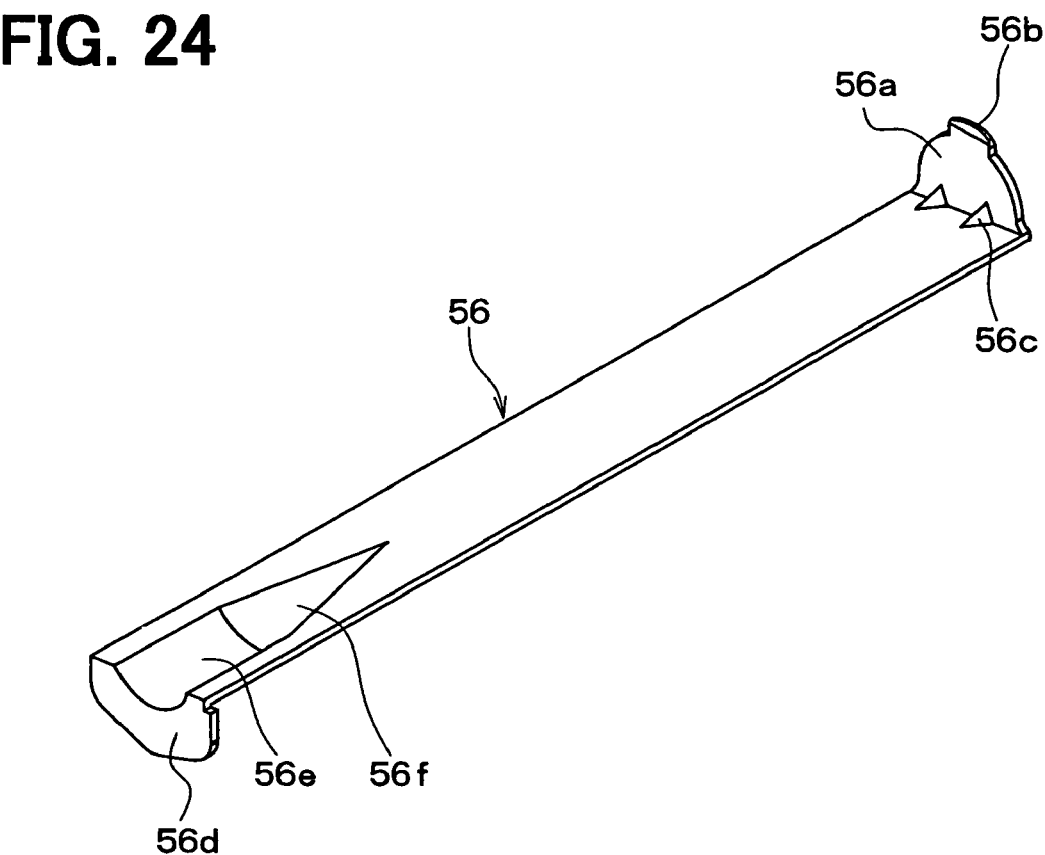
FIG. 24 is a perspective view showing a partition plate of the integrated unit according to the fifth embodiment.

A partition plate 56 is disposed in the substantial center part of the right space 28 of the upper tank 18b in the vertical direction. This partition plate 56 is a substantially plate-like member which entirely extends in the tank longitudinal direction of the upper tank 18b as shown in FIG. 24, and brazed to the inner wall surface of the upper tank 18b.

The right space 28 of the upper tank 18b is partitioned vertically by the partitioned plate 56 into two spaces, namely, an upper space 28a and a lower space 28b.

A flexed part 56a (bent part) which is bent upward at right angle is formed on one of the longitudinal ends of the partition plate 56 (e.g., on the right end of FIGS. 18 and 24), which end is positioned on the outlet side of the capillary tube 17a. A lug 56b (Claw part) is formed which protrudes from the tip end of the flexed part 56a upward. The lug 56b penetrates the slit-like hole 57 (see FIG. 18) on the upper surface of the upper tank 18b, and caulked and fixed to the upper tank 18b.

Thus, the partition plate 56 can be temporarily fixed to the upper tank 18b before being brazed thereto. Also, providing a predetermined distance shown in FIG. 18 between the flexed part 56a of the partition plate 56 and the outlet end of the capillary tube 17a causes the outlet end of the capillary tube 17a to communicate with the lower space (refrigerant distribution space) 28b of the right space 28.

Ribs 56c each protruding toward the inside of the flexed part 56a of the partition plate 56 in a triangle shape (see FIG. 24) are hammered out. This ensures the rigidity of the flexed part 56a of the partition plate 56, thereby preventing a change in the flexed angle.

A flexed part 56d (bent part) which is bent downward at right angle is formed on the other longitudinal end of the partition plate 56 (on the left end of FIGS. 18 and 24), which end is positioned on the ejector fixing plate 54 side. The flexed part 56d is in contact with the ejector fixing plate 54 and the tube-side half member 40 of the upper tank 18b, and brazed to both members 54 and 40.

The tip end of the ejector 14 in the longitudinal direction (an outlet of the diffuser 14d) penetrates the cylindrical part 54a of the ejector fixing plate 54 to protrude into the upper space 28a of the right space 28 within the upper tank 18b, so that the outlet of the diffuser 14d directly communicates with the inside of the upper space 28a.

In the partition plate 56, an arc-shaped recessed part 56e adjacent to the flexed part 56d is formed to be recessed downward. The lower part on the outlet side of the diffuser 14d of the ejector 14 is fitted onto the arc-shaped recessed part 56e. Following the arc-shaped recessed part 56e, a guide part 56f is formed on the partition plate 56. This guide part 56f is formed in a slanted arc shape, and is adapted to smoothly guide the flow of a refrigerant flowing from the outlet of the diffuser 14d.

The upper space 28a of the right space 28 within the upper tank 18b communicates with the right space (refrigerant distribution side space) 32 of the upper tank 15b of the first evaporator 15 via the communication hole 58 (see FIGS. 18 and 19). A plurality of communication holes 58 (four holes in an example shown) are formed along the longitudinal direction of the tank as shown in FIG. 18.

This communication hole 58 is formed at a connection part between the two upper tanks 15b and 18b as shown in FIG. 19. More specifically, a flat plate surface 60 formed in the center of the substantially W-shaped section of the tube-side half member 40 of the two upper tanks 15b and 18b is connected with brazing to a flat plate surface 61 formed in the center of the substantially M-shaped section of the non-tube-side half member 41 of the two upper tanks 15b and 18b. In this connection, a plurality of recesses recessed upward are formed on the flat place surface 61 of the non-tube-side half member 41, and the space enclosed by these recesses and the flat plate surface 60 of the tube-side half member 40 form the communication hole 58.

FIG. 17 illustrates a state in which the ejector 14 is inserted into the upper tank 18b through the hole portion 45 for insertion of the ejector of the first connection block 23, and the hole (the main-passage-side opening 49) of the cylindrical part 46 of the intervening plate 44. After insertion of the ejector 14, a spacer 62 is inserted into the hole portion 45 for insertion of the ejector 14 of the first connection block 23, and thereafter, an external thread 63a on the outer peripheral surface of a cylindrical plug 63 mates with an internal thread on the inner peripheral surface of the hole portion 45 for insertion of the ejector.

Figure 23:
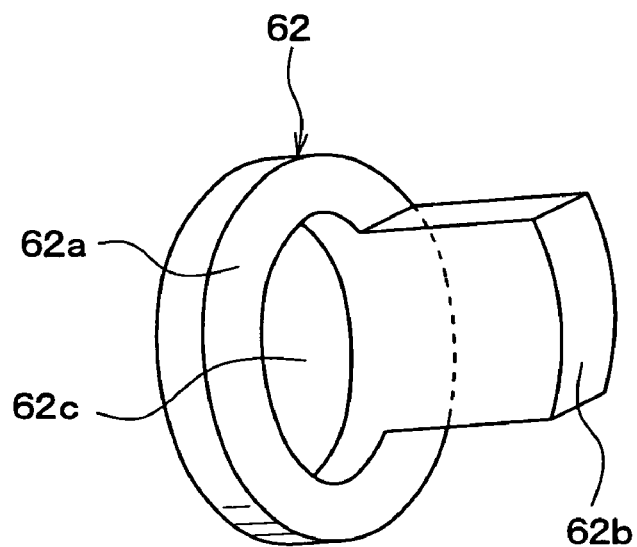
FIG. 23 is a perspective view showing a spacer of the integrated unit according to the fifth embodiment.

The spacer 62 has a protrusion piece 62b integrally formed and protruding vertically from a ring-shaped main body 62a, as shown in FIG. 23. That is, the protrusion piece 62b protrudes in the longitudinal direction of the ejector 14 as shown in FIG. 17. This protrusion piece 62b is abutted against the inlet side end (the left end of FIG. 17) of the longitudinal direction of the ejector 14, thereby fixing the ejector 14 in the longitudinal direction.

The protrusion piece 62b has such a shape that protrudes only from a part of the main body 62a in the circumferential direction. Thus, the protrusion piece 62b is positioned at a part of the inside of the hole portion 45 for the ejector insertion, which part is opposed to the refrigerant inlet 25, as shown in FIG. 17. The protrusion piece 62 does not interfere with the refrigerant flow between the main passage 25a of the first connection block 23 and the main-passage-side opening 49 inside the cylindrical part 46 of the intervening plate 44.

Since the main body 62a of the spacer 62 is formed in a ring shape, the peripheral edge of a ring-shaped center hole 62c is grasped, and the spacer 62 is inserted into the hole portion 45, so that the spacer 62 can be assembled easily and accurately.

The plug 63 includes an engagement recessed part 63b with a hexagonal shape or the like for engagement of a tool on its outer end surface (see FIGS. 15 and 17), and an O-ring 29c is disposed on the outer peripheral surface of the tip side away from the external thread 63a. The O-ring 29c is elastically pressed against the inner peripheral surface of the hole portion 45 for the ejector insertion of the first connection block 23, thereby sealing between the plug 63 and the hole portion 45 for the ejector insertion.

Figure 25:
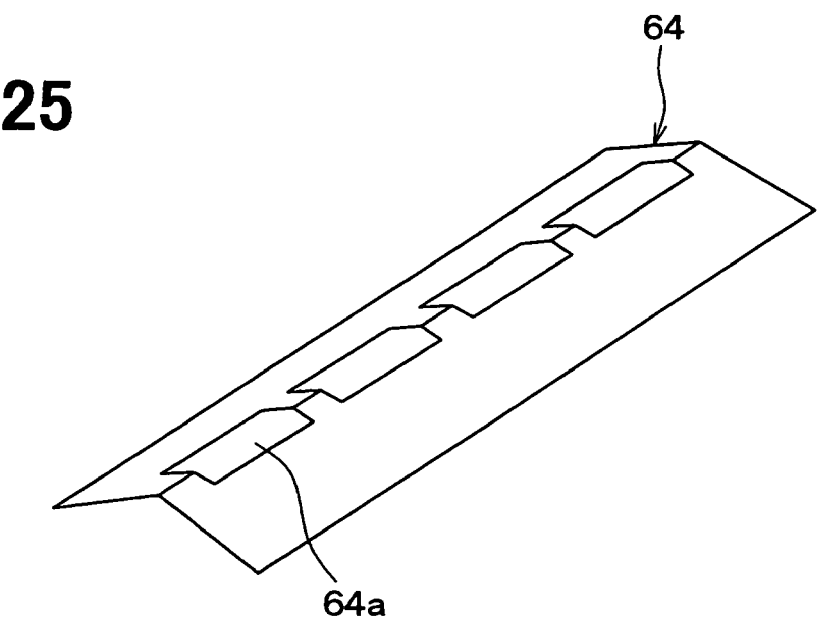
FIG. 25 is a perspective view showing a refrigerant retention plate of the integrated unit according to the fifth embodiment.

On the other hand, in the substantial center of the lower space 28b of the right space 28 within the upper tank 18b in the vertical direction, a refrigerant retention plate 64 is disposed. The refrigerant retention plate 64 is a refrigerant storing member to be brazed to the inner wall surface of the upper tank 18b. As shown in FIG. 25, the refrigerant retention plate 64 is a plate-like member having a mountain-like section and extending in the longitudinal direction of the upper tank 18b.

In the apex part of the mountain-like section of the refrigerant retention plate 64, a plurality of holes 64a are punched out in a rectangular shape, for example, in the longitudinal direction of the upper tank 18b.

The lower space 28b serves as a distribution side tank space for distributing the refrigerant to the upper openings of the plurality of tubes 21 as shown in FIG. 18. The refrigerant retention plate 64 stores the liquid refrigerant of the liquid-vapor two-phase refrigerant from the capillary tube 17a in a valley-like portion 65 formed on two sides of the mountain-like section of the plate (FIG. 19), and allows the liquid refrigerant to fall from a plurality of rectangular holes 54a, thereby uniformly distributing the refrigerant to the openings on the upper ends of the plurality of tubes 21.

As shown in FIG. 21, two screw holes 66 are formed in the intermediate part between the refrigerant inlet 25 and the refrigerant outlet 26 on the side opposite to the tanks 15b and 18b of the evaporators 15 and 18 (on the outside surface) in the first connection block 23. The use of the screw holes 66 can secure the refrigeration cycle components, for example, the thermal expansion valve 13 and the first connection block 23, by screws.

In the embodiment, any one of the capillary tube 17a, the first connection block 23, the intervening plate 44, the ejector fixing plate 54, the partition plate 56, and the refrigerant retention plate 64 is integrally brazed to the evaporators 15 and 18, and hence is made of aluminum material as is the case with the evaporator components (e.g., the tube 21, the fin 22, the tanks 15b, 15c, 18b, and 18c and the like).

In contrast, the spacer 62 and the plug 63 are components for assembly of the ejector 14, which is assembled after integral brazing an integrated member with the evaporators 15 and 18. Thus, it is not necessary to select the material for the spacer 62 and the plug 63 considering the brazing, and the material of the spacer 62 and the plug 63 is not limited to the aluminum material. The spacer 62 and the plug 63 can be made of various metal materials including aluminum material, or of resin material. Furthermore, the ejector 14 may be made of the same material as in the first embodiment.

Now, a method for manufacturing the integrated unit 20 of the embodiment will be described in detail. First, in an assembly step, the evaporators 15 and 18 are temporarily assembled to a predetermined structure of the heat exchanger. In this assembly step, not only the inherent evaporator components, including the tanks 15b, 15c, 18b, 18c, the tubes 21, the fins 22, and the like, but also other components, including the first connection block 23, the intervening plate 44, the ejector fixing plate 54, the partition plate 56, and the refrigerant retention plate 64 are assembled to the respective positions. And, the assembled body is hold using an appropriate jig, such as a wire.

Then, in a brazing step, the evaporator assembly hold by the jig is brazed integrally. In this brazing step, the evaporator assembly is delivered into a furnace for brazing, where the assembly is heated at a brazing temperature (at a temperature that is a little bit higher than the melting point of an aluminum brazing filler metal) for a predetermined time in the furnace, so that the aluminum brazing filler metal is melted. Thereafter, the evaporator assembly is carried out from the furnace, and then cooled.

This can connect the connection parts of the evaporators 15 and 18 integrally with the aluminum brazing filler metal, thereby assembling each component of the evaporators 15 and 18 to the integrated structure.

Then, an assembling step of the ejector 14 is performed. In the evaporator assembly brazed in the above-described brazing step, the spacer 62 and the plug 63 shown in FIG. 17 are not assembled yet.

In this brazed state, the hole portion 45 for the ejector insertion of the first connection block 23, the cylindrical part 46 of the intervening plate 44, and the cylindrical part 54a of the ejector fixing plate 54 are arranged coaxially in the longitudinal direction of the ejector (in the longitudinal direction of the tank 18b), and the hole portion 45 for the ejector insertion is opened outward. Thus, the ejector 14 can be inserted from the hole portion 45 into the tank 18b through the inside of the cylindrical part 46 of the intervening plate 44.

The outlet part of the diffuser 14d positioned at the tip end of the ejector 14 is fitted into the inner peripheral side of the cylindrical part 54a of the ejector fixing plate 54. When an amount of the insertion of the ejector 14 reaches a predetermined value, a ring-shaped protrusion around the O-ring groove 14e formed on the outer peripheral surface of the nozzle part 14a positioned at the root of the ejector 14 is abutted against the flange part 46a formed at the tip end of the cylindrical part 46 of the intervening plate 44, which stops the insertion of the ejector 14. This can define and set the insertion position of the ejector 14 in the longitudinal direction to a predetermined position.

A fitting part between the outer periphery of the tip end of the ejector 14 and the cylindrical part 54a of the ejector fixing plate 54, and a fitting part between the outer periphery of the root side of the ejector 14 and the cylindrical part 46 of the intervening plate 44 are sealed with the O-rings 29a and 29b, respectively.

In the above-described inserting work of the ejector 14, a protrusion (not shown) formed on the outer peripheral surface of the nozzle part 14a positioned at the root of the ejector 14 is fitted into the groove 46b (see FIG. 20) formed on the flange 46a of the intervening plate 44, so that the assembly position of the ejector 14 in the circumferential direction (rotation direction) can be set to the predetermined position. More specifically, this predetermined position is such a position that the refrigerant suction port 14b of the ejector 14 is directed downward of the ejector 14 as shown in FIGS. 16 and 17. This can constantly fix the circumferential (rotational) position of the refrigerant suction port 14b of the ejector 14 to an appropriate position directed to the upper end opening of the tube 21 in the tank space 27.

As described above, after the inserting work of the ejector 14, the spacer 62 is inserted into the hole portion 45 for the ejector insertion of the first connection block 23, and the external thread 63a of the plug 63 is screwed to the internal thread of the hole portion 45. Thus, the spacer 62 is pressed against by the tip end of the plug 63, causing the tip end of the protrusion piece 62b of the spacer 62 to abut against the side end of the nozzle part 14a of the ejector 14.

This can fix the longitudinal direction position of the ejector 14. That is, the longitudinal direction position of the ejector 14 can be fixed surely by the abutting part between the ring-shaped protrusion of the O-ring groove 14e and the flange part 46a, as well as by the abutting part between the protrusion piece 62b of the spacer 62 and the side end of the nozzle part 14a of the ejector 14.

Both ends of the ejector 14 in the longitudinal direction are supported by the fitting part between the cylindrical part 54a of the ejector fixing plate 54 and the cylindrical part 46 of the intervening plate 44. Thus, both ends of the ejector 14 in the longitudinal direction can be fixed surely with respect to the radial direction.

The refrigerant flow path of the entire integrated unit 20 structured and manufactured as described above will be explained below in more detail with reference to FIGS. 16 to 18. The refrigerant inlet 25 of the first connection block 23 is branched into the main passage 25a and the branch passage 16. The refrigerant on the main passage 25a passes through the main passage side opening 49 inside the cylindrical part 46 of the intervening plate 44, and then is decompressed through the ejector 14 (the nozzle part 14a→the mixer 14c→the diffuser 14d). The decompressed low-pressure refrigerant flows into the upper space 28a of the right space 28 in the upper tank 18b of the second evaporator 18 positioned downwind.

Thereafter, the refrigerant flows into the right space 32 of the upper tank 15b of the first evaporator 15 positioned upwind through the plurality of communication holes 58 as indicated by the arrow "a".

The refrigerant in the right space 32 is distributed to the tubes 21 in the right part of an upwind-side heat exchange core 15a, and moves downward through the plurality of tubes 21 as indicated by an arrow "b" to flow into the right part within the lower tank 15c. In the lower tank 15c, no partition plate is provided, and hence the refrigerant moves from the right part of the lower tank 15c into the left part thereof as indicated by an arrow "c".

The refrigerant of the left part of the lower tank 15c moves upward through the tubes 21 of the left part of the upwind-side heat exchange core 15a as indicated by an arrow "d", to flow into the left space 31 of the upper tank 15b. Furthermore, the refrigerant from the left space 31 flows into the refrigerant outlet 26 of the first connection block 23 as indicated by an arrow "e".

In contrast, the refrigerant on the branch passage 16 of the first connection block 23 is first decompressed through the capillary tube 17a. The decompressed low-pressure refrigerant (liquid-vapor two-phase refrigerant) flows into the lower space 28b of the right space 28 of the upper tank 18b of the second evaporator 18 as indicated by an arrow "f".

The liquid refrigerant among the refrigerants flowing into the lower space 28b is temporarily stored in the valley-like portions 65 (see FIG. 19) positioned on both the left and right sides of the mountain-like refrigerant retention plate 56, and some liquid refrigerant overflows from a rectangular hole 54a near the apex of the mountain-like refrigerant retention plate 64 to fall downward.

The liquid-vapor two-phase refrigerant including the liquid refrigerant falling from the rectangular hole 54a moves downward through the tubes 21 of the right part of the downwind-side heat exchange core 18a as indicated by an arrow "g" to flow into the right part within the lower tank 18c. In the lower tank 18c, no partition plate is provided, and the refrigerant moves from the right side of the lower tank 18c to the left side as indicated by an arrow "h".

The refrigerant of the left part of the lower tank 18c moves upward through the tubes 21 of the left part of the downwind-side heat exchange core 18a as indicated by an arrow "i" to flow into the left space 27 of the upper tank 18b. Since the refrigerant suction port 14b of the ejector 14 communicates with the left space 27, the refrigerant within the left space 27 is sucked from the refrigerant suction port 14b into the ejector 14.

The integrated unit 20 has the refrigerant flow path structure as described above. Only one refrigerant inlet 25 can be provided in the first connection block 23 of the entire integrated unit 20, and also only one refrigerant outlet 26 can be provided in the first connection block 23.

Now, the operation and effect of the embodiment will be described.

(1) Since the ejector 14 is adapted to be inserted into the evaporator tank 18b, the inside space of the evaporator tank can be effectively used as an installation space of the ejector 14, thereby permitting reduction in installation space of the integrated unit 20, including the ejector 14, and the evaporators 15 and 18.

In addition, after integrally brazing the first and second evaporators 15 and 18, the ejector 14 is inserted into the evaporator tank 18b. This can avoid inconveniences, including deterioration in dimensional accuracy of the ejector due to thermal deformation of the ejector nozzle part 14a at high temperature in brazing.

(2) Since the hole portion 45 for insertion of the ejector 14 is sealed with the screw type plug 63, attachment and detachment of the plug 63 can facilitate the attachment and detachment, and replacement of the ejector 14.

(3) Since the ejector 14 is inserted into the space 27 positioned at the outlet of the refrigerant flow for collecting the refrigerant flows in the tank of the second evaporator 18 on the downwind side, the refrigerant suction port 14b of the ejector 14 is directly communicated (opened) with the space 27, whereby the refrigerant evaporated at the second evaporator 18 on the downwind side can be sucked directly into the refrigerant suction port 14b.

Thus, no pipes or the like for a refrigerant suction passage into the refrigerant suction port 14b are needed. This can simplify the refrigerant passage structure, while improving the cooling performance of the downwind side evaporator 18 by decreasing loss in pressure of the sucked refrigerant flow.

A refrigerant evaporation temperature of the second evaporator 18 for evaporating the sucked refrigerant of the ejector 14 is lower than that of the first evaporator 15 for evaporating the sucked refrigerant from the ejector 14. Furthermore, the second evaporator 18 can be disposed on the downwind side of the first evaporator 15. Both of the first and second evaporators 15 and 18 can ensure a difference in temperature between the refrigerant and the air, thereby cooling the air effectively.

(4) Since the refrigerant inlet 25 and the refrigerant outlet 26 as well as the hole portion 45 for insertion of the ejector 14 are formed in the one connection block 23 (first connection block 23), the hole portion 45 can be provided at low cost.

(5) Since the recessed groove 47 as well as the refrigerant passages 25a and 16 are formed into one connection block 23, the one connection block 23 can double as a refrigerant passage forming member, which results in miniaturization and low cost.

(6) More specifically, by combining the first connection block 23 and the intervening plate 44, the refrigerant passages 25a and 16 are formed. Thus, even if the refrigerant passages 25a and 16 have a complicated structure, such as a V-like curved shape as shown in FIG. 20, the combination of both the members 23 and 44 can form the refrigerant passages 25a and 16 with ease.

(7) The recessed groove 47 of the first connection block 23 forms the main refrigerant passage 25a for connecting the refrigerant inlet 25 to the inlet side of the ejector nozzle part 14a, and the branch passage 16 for connecting the refrigerant inlet 25 to the inlet side of the capillary tube 17a. Also, the groove 47 places the connection position of the branch passage 16 with the inlet side of the capillary tube 17a, on the downstream side of the refrigerant flow away from the connection position of the main refrigerant passage 25a with the inlet side of the ejector nozzle part 14a.

Thus, the liquid refrigerant having a large density and a large inertial force among the refrigerant flow from the refrigerant inlet 25 is apt to flow into the inlet side of the capillary tube 17a rather than the inlet side of the ejector nozzle part 14a. As a result, a control function of the refrigerant flow rate can be exhibited well by the capillary tube 17a. This effect can also be shown in use of the fixed throttle 17b (see FIG. 7), such as an orifice, as a throttle unit, instead of the capillary tube 17a.

(8) In the intervening plate 44, is formed the cylindrical part 46, into which the ejector 14 can be fitted and fixed. The ejector fixing plate 54 is disposed in the tank 18b. Also, the ejector 14 is fitted into and fixed to the cylindrical part 54a of the ejector fixing plate 54.

Thus, two parts of the ejector 14 in the longitudinal direction can be fixed to the evaporator tank 18b side, thereby fixing the ejector 14 stably. Furthermore, since in the inserting work of the ejector 14, the cylindrical part 54a guides the insertion of the ejector, the inserting work of the elongated ejector 14 can be also carried out easily.

The cylindrical part 46 of the intervening plate 44 and the ejector fixing plate 54 constitute ejector fixing mechanisms positioned on the coaxial line of the hole portion 45 for the ejector insertion. Although in the embodiment, two ejector fixing mechanisms are formed at two parts of the ejector 14 in the longitudinal direction, only one ejector fixing mechanism may be provided on the ejector 14 in the longitudinal direction.

(9) In the cylindrical part 46 of the intervening plate 44, is formed the groove 46b, into which the protrusion (not shown) of the ejector 14 side is fitted to prevent the rotation of the ejector 14, thereby defining the assembly position of the ejector in the circumferential direction. This can fix the position of the refrigerant suction port 14b of the ejector 14 constantly at an appropriate predetermined position on the structure of the refrigerant flow path.

In the fifth embodiment, the combination of the groove 46b of the cylindrical part 46 of the intervening plate 44 with the protrusion of the ejector 14 side constitutes rotation preventing means for setting the assembly position of the ejector 14 in the circumferential direction. However, the above-described rotation preventing means may be provided in the fitting part between the cylindrical part 54a of the ejector fixing plate 54 and the ejector 14, and not in the fitting part between the cylindrical part 46 of the intervening plate 44 and the ejector 14.

On both the intervening plate 44 and the ejector fixing plate 54, the above-described rotation preventing means may be provided.

(10) Since the hole portion 45 for insertion of the ejector 14 is disposed on the side with the refrigerant inlet 25 formed thereon among the longitudinal sides of the evaporator tank, the refrigerant from the refrigerant inlet 25 can be introduced into the ejector nozzle part 14a through a short passage. Thus, the refrigerant from the refrigerant inlet 25 can be introduced into the ejector nozzle part 14a, reducing loss in pressure of the refrigerant.

(11) Referring to FIG. 15, the tubes 21 in a range X constitute a refrigerant outlet side passage (a refrigerant passage as indicated by the arrow "i" of FIG. 16), which is disposed on the left side of the ejector fixing plate 54, and which is communicated with the left space 27 of the tank 18b. In contrast, the tubes 21 in a range Y constitute a refrigerant inlet side passage (a refrigerant passage as indicated by the arrow "g" of FIG. 16), which is disposed on the right side of the ejector fixing plate 54, and which is communicated with the lower space 28b of the right space 28 of the tank 18b. The number of the tubes 21 on the refrigerant outlet side (the total sectional area of the passages) as indicated by the range X, which are communicated with the left space 27 of the tank 18b, is larger then the number of the tubes 21 on the refrigerant inlet side (the total sectional area of the passages) as indicated by the range Y, which are communicated with the lower space 28b of the right space 28 of the tank 18b.

Thus, the longitudinal length of the left space 27 becomes larger than that of the right space 28, so that a space for insertion of the ejector 14 in the longitudinal direction can be enlarged. This can increase the length of the ejector 14, thereby improving the ejector performance.

The dryness of the refrigerant flowing through the refrigerant outlet side tubes 21 in the range X is larger than that of the refrigerant flowing through the refrigerant inlet side tubes 21 in the range Y. The specific volume of the refrigerant increases with increased dryness of the refrigerant, which tends to result in increased loss in pressure of the refrigerant flow. However, since in the embodiment the number of the refrigerant outlet side tubes 21 as indicated by the range X is larger than that of the refrigerant inlet side tubes 21 as indicated by the range Y, the total sectional area of the passages of the refrigerant outlet side tubes 21 of the range X becomes larger than that of the refrigerant inlet side tubes 21 of the range Y, which can avoid the increase in loss of the pressure of the refrigerant flow.

Sixth Embodiment

In the above-described fifth embodiment, the entire structure of the ejector 14 is separately provided from the evaporator tank 18b. However, in the sixth embodiment, a part of the ejector 14 is integrally formed on the evaporator tank 18b side.

Figure 26:
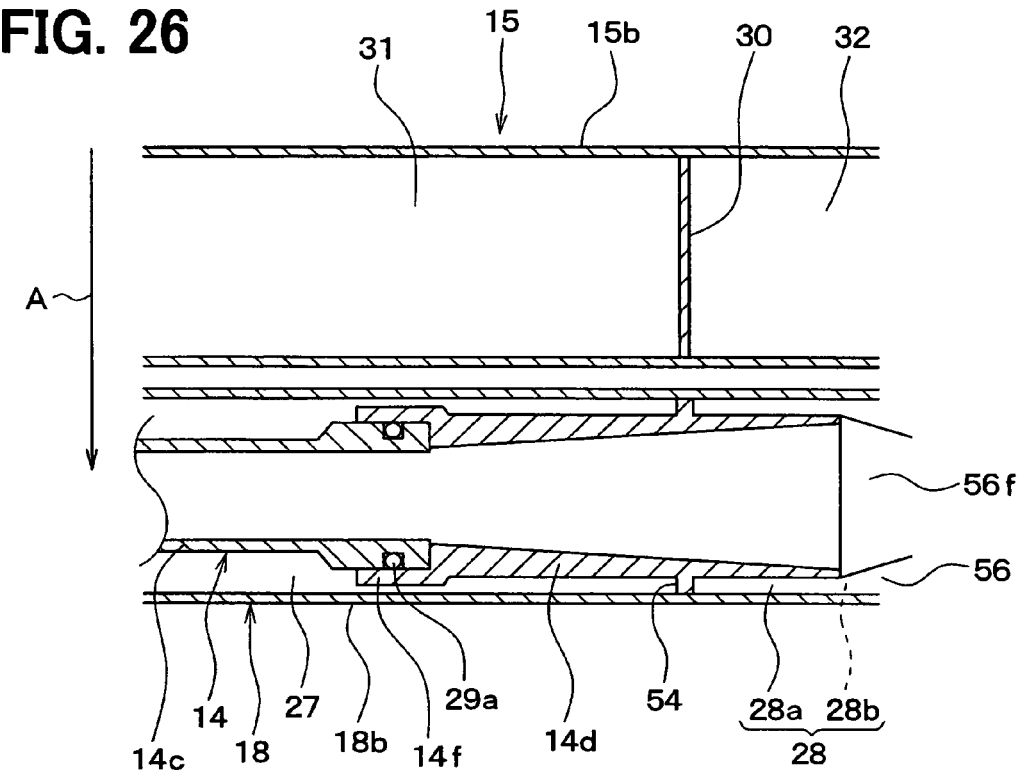
FIG. 26 is a sectional view showing a part of an evaporator tank according to a sixth embodiment of the present invention.

FIG. 26 illustrates a part of the integrated unit of the sixth embodiment, and showing only a part different from in FIG. 17. In the sixth embodiment, the diffuser 14d serving as a pressure increasing portion of the ejector 14 is integrally formed of the aluminum material with the ejector fixing plate 54 of the fifth embodiment.

The center hole of the diffuser 14d has such a shape that a passage sectional area is generally enlarged toward the downstream side. In contrast, the outer peripheral shape of the diffuser 14d is a cylindrical shape. On the upstream end of the diffuser 14d, an enlarged cylindrical part 14f is formed.

On the other hand, on the ejector 14 side, the mixer 14c having an elongated cylindrical shape is formed from the nozzle part 14a, but the diffuser 14d is not formed. Instead, the O-ring 29a is fitted into and hold by the downstream end of the mixer 14c.

In the sixth embodiment, the ejector fixing plate 54 with which the diffuser 14d is integrally formed is assembled into the tank 18b as one component of the evaporator 18 side before brazing, and integrally brazed to the evaporator 18 side.

After the brazing step of the evaporators 15 and 18, the ejector 14 is inserted into the left space 27 of the tank 18b, so that the downstream end of the mixer 14c of the ejector 14 (a holding member of the O-ring 29a) is fitted into the inner periphery of the enlarged cylindrical part 14f at the upstream end of the diffuser 14d.

This causes the O-ring 29a to be elastically pressed against the inner periphery of the enlarged cylindrical part 14f, thereby sealing the fitting part. At the same time, the downstream end of the mixer 14c of the ejector 14 can be fixed to the tank 18b via the diffuser 14d and the ejector fixing plate 54.

The sixth embodiment may have the same structure as that of the fifth embodiment shown in FIG. 17 except that the mixer 14c and the diffuser 14d of the ejector 14 are formed separately, and that both members 14c and 14d are fitted into and connected to each other, and thus description thereof will be omitted hereinafter.

According to the sixth embodiment, the diffuser 14d is formed separately from the mixer 14c, and hence the diffuser 14d does not need to pass through the cylindrical part 46 of the intervening plate 44. Thus, the outer diameter of the diffuser 14d can be larger than the inner diameter of the cylindrical part 46, thereby improving the effect of increasing the refrigerant pressure by the diffuser 14d.

Separating the diffuser 14d from the mixer 14c can shorten the total length of the ejector 14 in the longitudinal direction, thereby facilitating the inserting work of the ejector 14.

Since the diffuser 14d is brazed integrally to the evaporators 15 and 18, the diffuser 14d will be subjected to high temperature environment in brazing. The diffuser 14d does not need high-accuracy scale management, which is required in the nozzle part 14a. Even deterioration of the scale accuracy that may be caused in the diffuser 14d due to the thermal deformation in brazing does not cause any practical problem.

Seventh Embodiment

Figure 27:
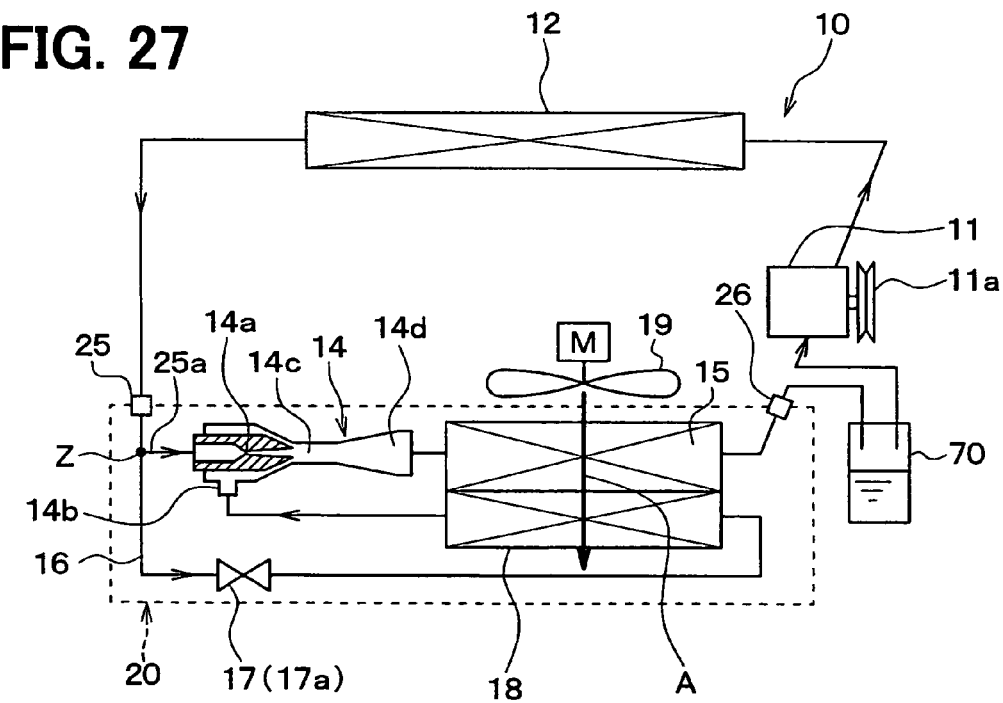
FIG. 27 is a refrigerant circuit diagram of an ejector refrigerant cycle device for a vehicle according to a seventh embodiment of the present invention.

In the first embodiment, the expansion valve type cycle including the liquid receiver 12a on the outlet side of the radiator 12, and the expansion valve 13 disposed on the outlet side of the liquid receiver 12a is employed. However, in the seventh embodiment, as shown in FIG. 27, an accumulator 70 is provided which serves as a liquid-vapor separator for separating the refrigerant into liquid and vapor phases on the outlet side of the first evaporator 15, and for storing the excessive refrigerant in the form of liquid. The vapor-phase refrigerant is derived from the accumulator 70 into the suction side of the compressor 11.

In the accumulator cycle of the FIG. 27, a liquid-vapor interface between the vapor-phase refrigerant and the liquid-phase refrigerant in the accumulator 70 is formed, and hence it is not necessary to control the superheat degree of the refrigerant at the outlet of the first evaporator 15 by the expansion valve 13 like the first embodiment.

Since the liquid receiver 12a and the expansion valve 13 are deleted from the accumulator cycle, the refrigerant inlet 25 of the integrated unit 20 may be directly connected to the outlet side of the radiator 12. The refrigerant outlet 26 of the integrated unit 20 may be connected to the inlet side of the accumulator 70, and the outlet side of the accumulator 70 may be directly connected to the suction side of the compressor 11.

In the seventh embodiment, any one structure of the integrated unit 20 described above can be used for the integrated unit 20 of the refrigerant cycle (accumulator cycle) of FIG. 27.

Eighth Embodiment

Figure 28:
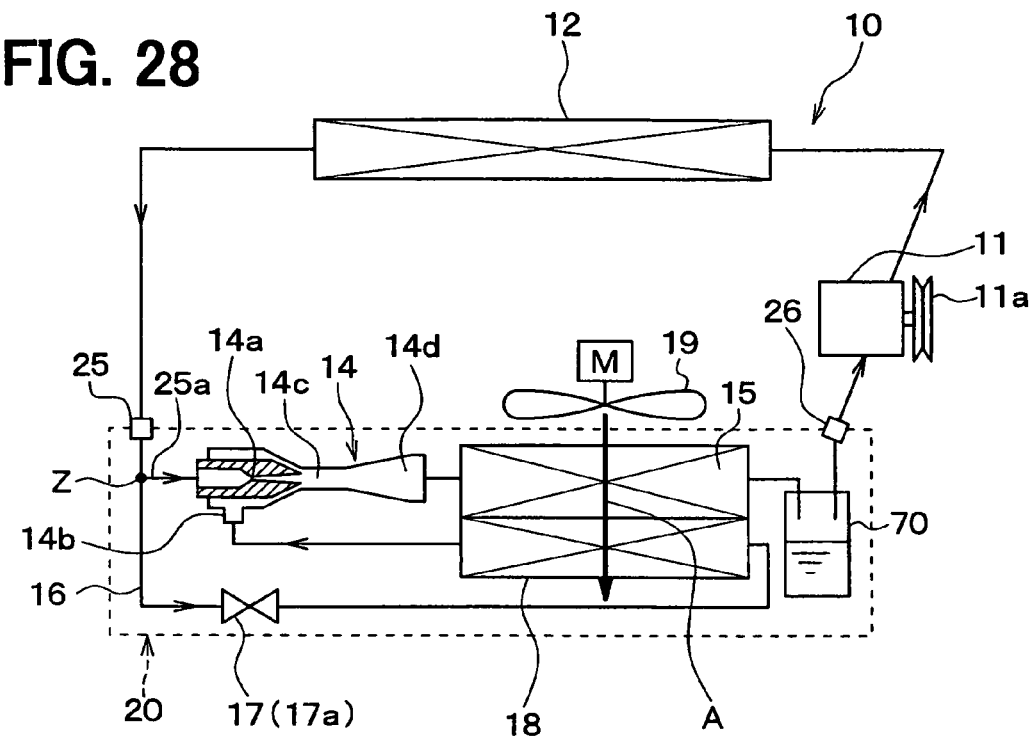
FIG. 28 is a refrigerant circuit diagram of an ejector refrigerant cycle device for a vehicle according to an eighth embodiment of the present invention.

The eighth embodiment is a modified one from the seventh embodiment. As shown in FIG. 28, the accumulator 70 is integrally incorporated into the integrated unit 20 as one element. The outlet part of the accumulator 70 constitutes the refrigerant outlet 26 of the entire integrated unit 20. In the eighth embodiment, the other parts can be made similarly to the above described seventh embodiment.

Ninth Embodiment

In any one of the above-described first to eighth embodiments, the branch passage 16 branching on the inlet side of the ejector 14 is connected to the refrigerant suction port 14b of the ejector 14, and the throttle 17 and the second evaporator 18 are disposed on the branch passage 16. However, in the ninth embodiment, as shown in FIG. 29, the accumulator 70 serving as the liquid-vapor separator is disposed at the outlet side of the first evaporator 15, the branch passage 16 is provided for connecting the liquid-phase refrigerant outlet part 70a of the accumulator 70 to the refrigerant suction port 14b of the ejector 14, and the throttle 17 and the second evaporator 18 are disposed in the branch passage 16.

In the ninth embodiment, the ejector 14, the first and second evaporators 15 and 18, the throttle 17, and the accumulator 70 constitute an integrated unit 20. In the entire integrated unit 20, one refrigerant inlet 25 is provided at the inlet of the ejector 14, which is connected to the outlet of the radiator 12.

In the entire integrated unit 20, one refrigerant outlet 26 is provided at the vapor-phase refrigerant outlet of the accumulator 70, and connected to the suction side of the compressor 11.

Figure 29:
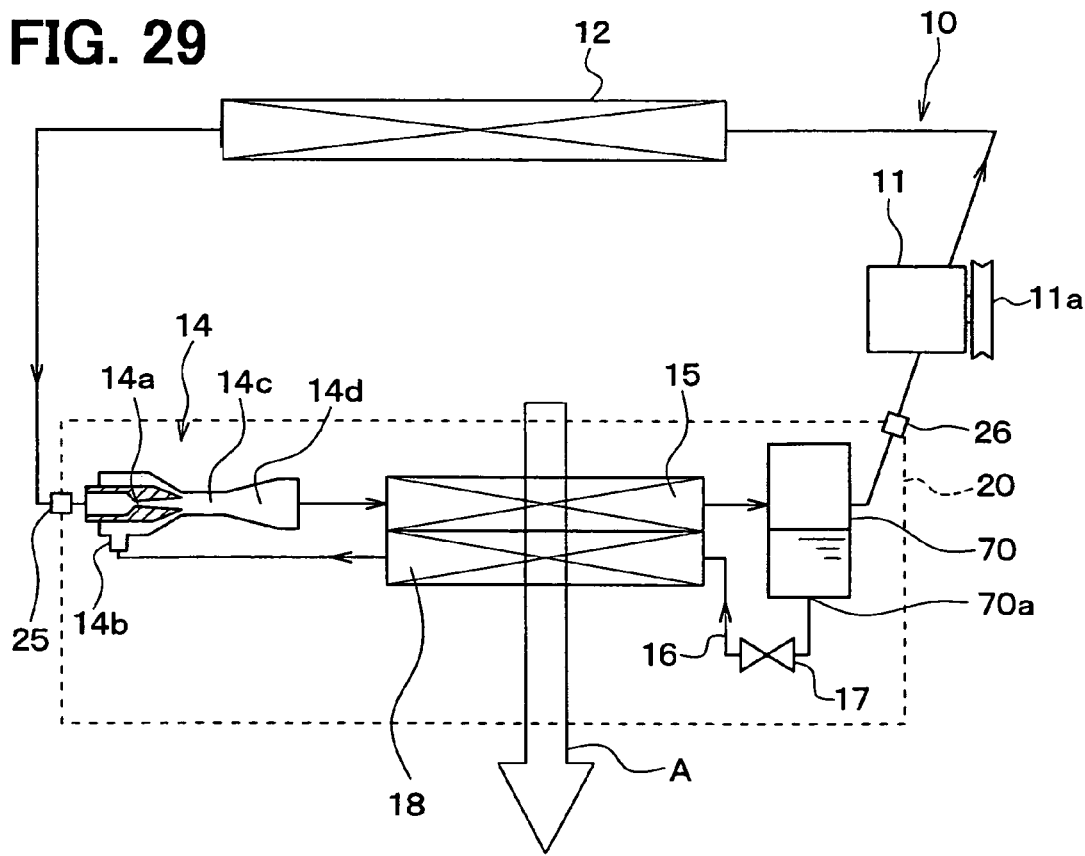
FIG. 29 is a refrigerant circuit diagram of an ejector refrigerant cycle device for a vehicle according to a ninth embodiment of the present invention.

In the ninth embodiment, any one integrated structure of the ejector 14 with the first and second evaporators 15, 18 described above can be used for the integrated unit 20 of the refrigerant cycle of FIG. 29.

Tenth Embodiment

Figure 30:
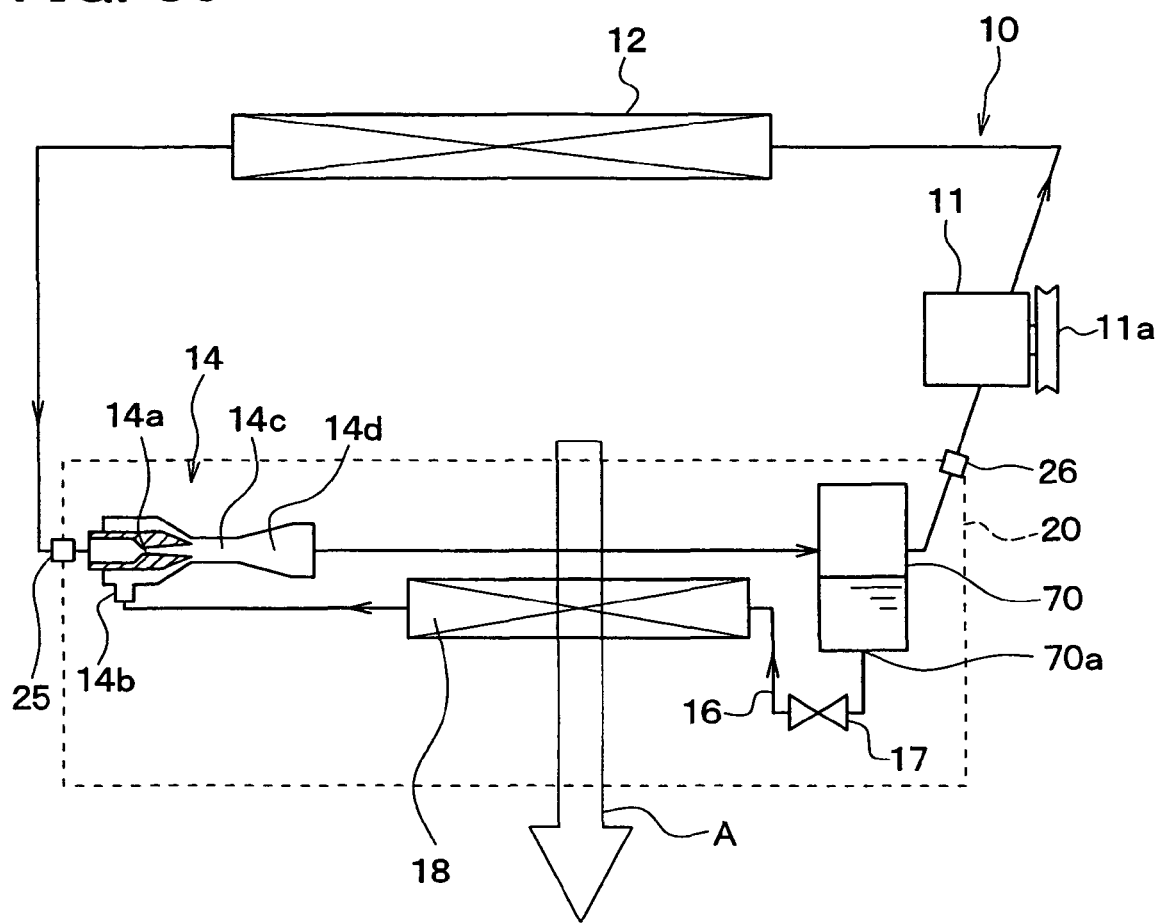
FIG. 30 is a refrigerant circuit diagram of an ejector refrigerant cycle device for a vehicle according to a tenth embodiment of the present invention.

In any one of the first to ninth embodiments includes the first evaporator 15 connected to the outlet side of the ejector 14, and the second evaporator 18 connected to the refrigerant suction port 14b of the ejector 14. However, in the tenth embodiment, as shown in FIG. 30, an integrated unit 20 is constituted in the ejector refrigerant cycle device 10 including only one evaporator 18 connected to the refrigerant suction port 14b of the ejector 14.

The integrated unit 20 of the tenth embodiment is constructed with the ejector 14, the evaporator 18, the throttle 17, and the accumulator 70. The integrated unit as the entire unit has one refrigerant inlet 25 and one refrigerant outlet 26. That is, the tenth embodiment corresponds to the unit of the ninth embodiment in which the first evaporator 15 is not provided.

In the tenth embodiment, the refrigerant flowing out of the ejector 14 is directly introduced into the accumulator 70 while the separated liquid refrigerant in the accumulator 70 is supplied to the evaporator 18 via the throttle 17. Then, the evaporated refrigerant of the second evaporator 18 is drawn into the refrigerant suction port 14b of the ejector 14.

Eleventh Embodiment

In any one of the above-described first to ninth embodiments, the throttle 17 is incorporated in the integrated unit 20. However, in the eleventh embodiment, as shown in FIG. 31, the integrated unit 20 is constructed with the first and second evaporators 15 and 18 and the ejector 14, and the throttle 17 is independently provided separately from the integrated unit 20.

Figure 31:
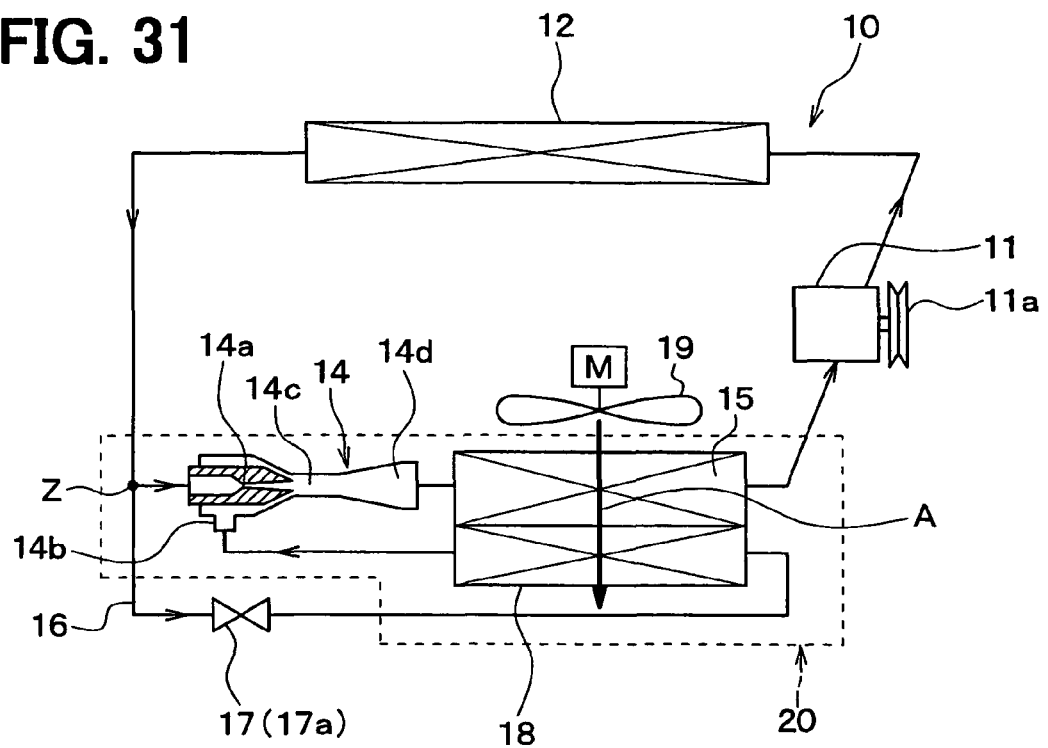
FIG. 31 is a refrigerant circuit diagram of an ejector refrigerant cycle device for a vehicle according to an eleventh embodiment of the present invention.

Also, in the eleventh embodiment, neither on the high-pressure side nor the low-pressure side of the cycle, the liquid-vapor separator is disposed, as shown in FIG. 31.

Twelfth Embodiment

Figure 32:
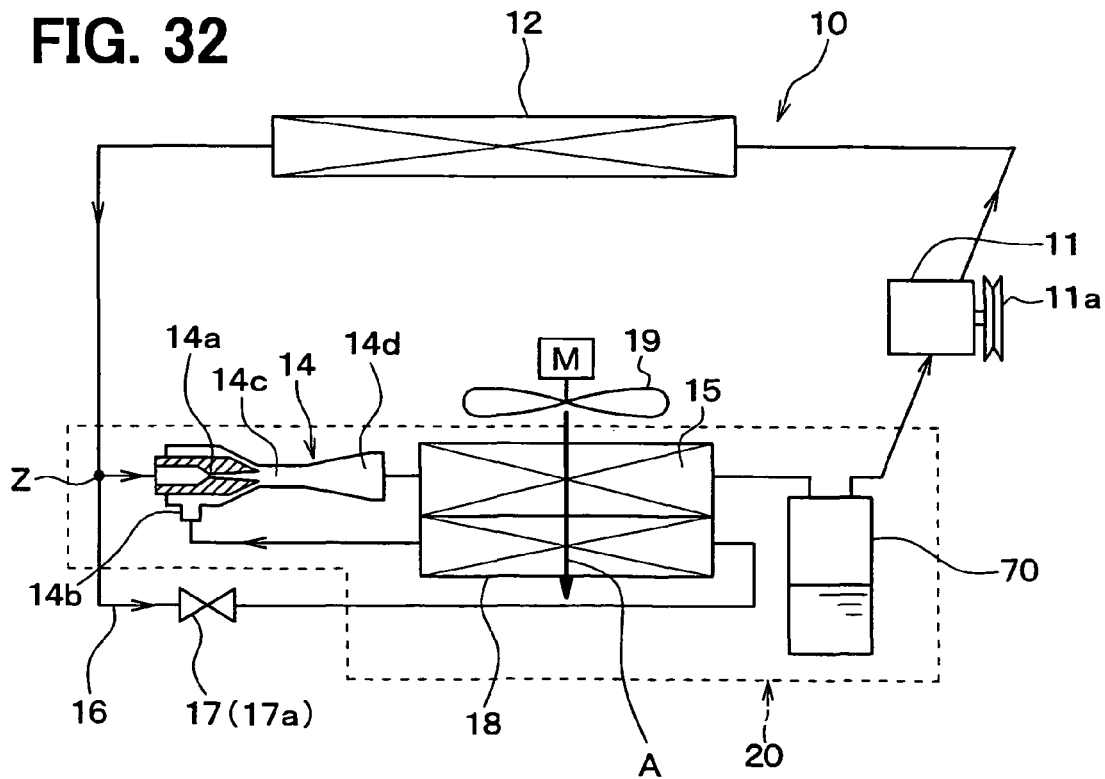
FIG. 32 is a refrigerant circuit diagram of an ejector refrigerant cycle device for a vehicle according to a twelfth embodiment of the present invention.

FIG. 32 illustrates the twelfth embodiment, in which the accumulator 70 serving as the liquid-vapor separator is provided on the outlet side of the first evaporator 15 with respect to the eleventh embodiment, and is integrally incorporated in the integrated unit 20. That is, in the twelfth embodiment, the ejector 14, the first and second evaporators 15 and 18, and the accumulator 70 constitute the integrated unit 20, and the throttle 17 is independently provided separately from the integrated unit 20.

In the twelfth embodiment, the other parts can be made similarly to the above-described eighth embodiment.

Other Embodiments

It should be understood that the invention is not limited to the above-mentioned embodiments, and various modifications can be made to the embodiments as follows.

(1) In the first embodiment, in integrally assembling each component of the integrated unit 20, the components other than the ejector 14, that is, the first evaporator 15, the second evaporator 18, the connection block 23, the capillary tube 17a, and the like are brazed integrally with each other. The integral assembly of these components can also be performed by various fixing means other than brazing, including screwing, caulking, welding, adhesion, and the like.

Although in the first embodiment, the exemplary fixing means of the ejector 14 is the screwing, any fixing means other than the screwing can be used as long as the fixing means may not cause thermal deformation. More specifically, the fixing means, such as caulking, or adhesion, may be used to fix the ejector 14.

(2) Although in the above-mentioned respective embodiments, the vapor-compression subcritical refrigerant cycle has been described in which the refrigerant is a flon-based one, an HC-based one, or the like, whose high pressure does not exceed the critical pressure, the invention may be applied to a vapor-compression supercritical refrigerant cycle which employs the refrigerant, such as carbon dioxide ($CO_2$), whose high pressure exceeds the critical pressure.

Note that in the supercritical cycle, only the refrigerant discharged by the compressor dissipates heat in the supercritical state at the radiator 12, and hence is not condensed. Thus, the liquid receiver 12a disposed on the high-pressure side cannot exhibit a liquid-vapor separation effect of the refrigerant, and a retention effect of the excessive liquid refrigerant. As shown in FIGS. 27 to 30, the supercritical cycle may have the structure including the accumulator 70 at the outlet of the first evaporator 15 for serving as the low-pressure liquid-vapor separator.

(3) Although in the above-mentioned embodiments, the throttle 17 is constructed by the fixed throttle hole 17b, such as the capillary tube 17a or the orifice, the throttle 17 may be constructed by an electric control valve whose valve opening (in which an opening degree of a passage restriction) is adjustable by the electric actuator. The throttle 17 may be composed of a combination of the fixed throttle, such as the capillary tube 17a, and the fixed throttle hole 17b, and an electromagnetic valve.

(4) Although in the above-mentioned respective embodiments, the exemplary ejector 14 is a fixed ejector having the nozzle part 14a with the certain path area, the ejector 14 for use may be a variable ejector having a variable nozzle part whose path area is adjustable.

For example, the variable nozzle part may be a mechanism which is designed to adjust the path area by controlling the position of a needle inserted into a passage of the variable nozzle part using the electric actuator.

(5) Although in the first embodiment and the like, the invention is applied to the refrigeration cycle device adapted for cooling the interior of the vehicle and for the freezer and refrigerator, both the first evaporator 15 whose refrigeration evaporation temperature is high and the second evaporator 18 whose refrigeration evaporation temperature is low may be used for cooling different areas inside the compartment of the vehicle (for example, an area on a front seat side inside the compartment of the vehicle, and an area on a back seat side therein).

Alternatively or additionally, both the first evaporator 15 whose refrigeration evaporation temperature is high and the second evaporator 18 whose refrigeration evaporation temperature is low may be used for cooling the freezer and refrigerator. That is, a refrigeration chamber of the freezer and refrigerator may be cooled by the first evaporator 15 whose refrigeration evaporation temperature is high, while a freezing chamber of the freezer and refrigerator may be cooled by the second evaporator 18 whose refrigeration evaporation temperature is low.

(6) Although in the first embodiment and the like, the thermal expansion valve 13 and the temperature sensing part 13*a* are separately provided from the unit for the ejector refrigerant cycle device, the thermal expansion valve 13 and the temperature sensing part 13*a* may be integrally incorporated in the unit for the ejector refrigerant cycle device. For example, a mechanism for accommodating the thermal expansion valve 13 and the temperature sensing part 13*a* in the connection block 23 of the integrated unit 20 can be employed. In this case, the refrigerant inlet 25 is positioned between the liquid receiver 12*a* and the thermal expansion valve 13, and the refrigerant outlet 26 is positioned between the compressor 11 and a passage part on which the temperature sensing part 13*a* is installed.

(7) It is apparent that although in the above-mentioned respective embodiments, the refrigeration cycle device for the vehicle has been described, the invention can be applied not only to the vehicle, but also to a fixed refrigeration cycle or the like in the same way.

(8) In the above-described first embodiment and fifth embodiment, the ejector 14 is inserted into the evaporator tank 18*b* from the hole portion 45 of the connection block 23. However, a hole portion for inserting the ejector 14 may be provided in a cap which covers an end portion of the evaporator tanks 15*b*, 15*c*, 18*b*, 18*c* in a tank longitudinal direction. For example, the cap 43 for closing the right side ends of the upper tanks 15*b*, 18*b* can be provided with the ejector inserting hole or a capillary tube inserting hole.

(9) In the above-mentioned respective embodiments, the tanks 15*b*, 15*c*, 18*b*, and 18*c* of the first evaporator 15 and the second evaporator 18 are disposed on both the upper and lower sides of the first evaporator 15, that is, the first evaporator 15 and the second evaporator 18 are disposed vertically. Alternatively, the first evaporator 15 and the second evaporator 18 may be disposed in a slanted manner with respect to the vertical direction.

Such changes and modifications are to be understood as being within the scope of the present invention as defined by the appended claims.

What is claimed is:

1. An integrated unit for a refrigerant cycle device, comprising:
    an ejector that has a nozzle part which decompresses refrigerant, and a refrigerant suction port from which refrigerant is drawn by a high-speed refrigerant flow jetted from the nozzle part, wherein the refrigerant jetted from the nozzle part and the refrigerant drawn from the refrigerant suction port are mixed and discharged from an outlet of the ejector;
    an evaporator located to evaporate the refrigerant to be drawn into the refrigerant suction port or the refrigerant discharged from the outlet of the ejector,
    a connection block located at an end portion of the tank in the tank longitudinal direction; and
    a throttle mechanism for decompressing refrigerant; wherein:
    the evaporator includes a plurality of tubes defining refrigerant passages through which refrigerant flows, a tank that is disposed at one end side of the tubes for distributing refrigerant into the tubes and for collecting the refrigerant from the tubes, wherein the tank extends in a tank longitudinal direction that is parallel to an arrangement direction of the tubes;
    the end portion of the tank has a hole portion for inserting the ejector;
    the ejector is inserted into an inner space of the tank from the hole portion;
    the connection block is provided with a refrigerant inlet for introducing the refrigerant, and a refrigerant outlet for discharging the refrigerant;
    the hole portion is provided in the connection block;
    the hole portion is provided separately from the refrigerant inlet and the refrigerant outlet;
    the connection block has a recess portion recessed from an inner surface to form a refrigerant path through which the refrigerant inlet communicates with an inlet of the nozzle part;
    the recess portion is provided to define a branch passage branched from the refrigerant path; and
    the branch passage communicates with an inlet side of the throttle mechanism.

2. The integrated unit according to claim 1, wherein:
    the evaporator includes an evaporator part located to evaporate the refrigerant to be drawn into the refrigerant suction port;
    the inner space of the tank includes a tank space for collecting the refrigerant from the tubes; and
    the ejector is inserted into the tank space of the inner space of the tank, and the refrigerant suction port directly communicates with the tank space.

3. The integrated unit according to claim 2, wherein the evaporator is a downstream evaporator located at a downstream side in an air flow direction to evaporate the refrigerant to be drawn into the refrigerant suction port, the integrated unit further comprising
    an upstream evaporator that is located upstream of the downstream evaporator in the air flow direction, wherein:
    the upstream evaporator is arranged for evaporating the refrigerant discharged from the outlet of the ejector;
    the tank space is positioned at a refrigerant outlet side for collecting the refrigerant from the tubes.

4. The integrated unit according to claim 1, wherein:
    the inner space of the tank is partitioned into a collecting space part for collecting the refrigerant from the tubes, and a distributing space part for distributing the refrigerant into the tubes;
    the ejector is inserted into the collecting space part of the tank; and
    a number of the tubes communicating with the collecting space part of the tank is larger than a number of the tubes communicating with the distributing space part.

5. The integrated unit according to claim 1, wherein:
the inner space of the tank has a tank space for distributing the refrigerant into the tubes and for collecting the refrigerant from the tubes, and an ejector inserting space separated from the tank space; and
the ejector is inserted into the ejector inserting space of the tank.

6. The integrated unit according to claim 1, wherein the tank has a refrigerant inlet in the end portion where the hole portion is provided.

7. The integrated unit according to claim 1, wherein the connection block defines a passage hole for defining the refrigerant inlet, and the hole portion is provided by the passage hole.

8. The integrated unit according to claim 1, further comprising
an intervening plate located between the connection block and the end portion of the tank in the tank longitudinal direction, wherein:
the intervening plate has an opening provided concentrically with the hole portion;
the ejector is inserted into the tank from the hole portion through the opening of the intervening plate; and
the refrigerant path is defined by combining the connection block and the intervening plate.

9. The integrated unit according to claim 1,
wherein the inlet side of the throttle mechanism is positioned in the branch passage at a position that is downstream from the inlet of the nozzle part in the refrigerant path.

10. The integrated unit according to claim 1,
wherein the throttle mechanism is a capillary tube located along the tank longitudinal direction and integrated with the tank.

11. The integrated unit according to claim 1,
wherein the connection block has a screw hole for connecting a member of the refrigerant cycle device.

12. The integrated unit according to claim 1, further comprising
an ejector fixing member for fixing the ejector concentrically with the hole portion, wherein the ejector is fastened and fixed to the ejector fixing member.

13. The integrated unit according to claim 12, wherein the ejector fixing member includes a fixing plate that is located in the tank for fixing the ejector.

14. The integrated unit according to claim 12, further comprising
an intervening plate located between the connection block and one side of the tank in the tank longitudinal direction, wherein:
the intervening plate includes a cylindrical portion having therein an opening provided concentrically with the hole portion;
the ejector is inserted into the tank from the hole portion of the connection block through the opening of the intervening plate; and
the ejector fixing member includes the cylindrical portion.

15. The integrated unit according to claim 14, wherein the cylindrical portion is provided with a rotation preventing portion as the ejector fixing member, for regulating an assembled position of the ejector in a circumferential direction.

16. The integrated unit according to claim 1, further comprising
an integrated member located in the tank and integrated with the tank, wherein the ejector is air-tightly fixed to the integrated member.

17. The integrated unit according to claim 16, wherein:
the ejector further has a pressure increasing portion in which a mixed refrigerant stream of the refrigerant jetted from the nozzle part and the refrigerant drawn from the refrigerant suction port is decelerated so as to increase pressure of the mixed refrigerant stream; and
the pressure increasing portion of the ejector is integrated with the integrated member.

18. The integrated unit according to claim 1, further comprising
a plug member which is screwed into the hole portion to seal the hole portion.

19. The integrated unit according to claim 18, further comprising
a spacer located between the plug member and the ejector to regulate a distance between the plug member and the ejector.

20. A refrigerant cycle device comprising:
a compressor for compressing refrigerant;
a radiator for cooling the refrigerant from the compressor;
an ejector that has a nozzle part for decompressing the refrigerant from the radiator, and a refrigerant suction port from which refrigerant is drawn by a high-speed refrigerant flow jetted from the nozzle part, wherein the refrigerant jetted from the nozzle part and the refrigerant drawn from the refrigerant suction port are mixed and discharged from an outlet of the ejector;
an evaporator located to evaporate the refrigerant to be drawn into the refrigerant suction port or the refrigerant discharged from the outlet of the ejector,
a connection block located at an end portion of the tank in the tank longitudinal direction; and
a throttle mechanism for decompressing refrigerant; wherein:
the evaporator includes a plurality of tubes defining refrigerant passages through which refrigerant flows, a tank that is disposed at one end side of the tubes for distributing refrigerant into the tubes and for collecting the refrigerant from the tubes, wherein the tank extends in a tank longitudinal direction that is parallel to an arrangement direction of the tubes;
the tank is provided with a hole portion for inserting the ejector at the end portion in the tank longitudinal direction;
the ejector is inserted into an inner space of the tank from the hole portion;
the connection block is provided with a refrigerant inlet for introducing the refrigerant, and a refrigerant outlet for discharging the refrigerant;
the hole portion is provided in the connection block;
the hole portion is provided separately from the refrigerant inlet and the refrigerant outlet;
the connection block has a recess portion recessed from an inner surface to form a refrigerant path through which the refrigerant inlet communicates with an inlet of the nozzle part;
the recess portion is provided to define a branch passage branched from the refrigerant path; and
the branch passage communicates with an inlet side of the throttle mechanism.

21. An integrated unit for a refrigerant cycle device, the unit comprising:
an ejector that has a nozzle part which decompresses refrigerant, and a refrigerant suction port from which refrigerant is drawn by a high-speed refrigerant flow jetted from the nozzle part, wherein the refrigerant jetted from the nozzle part and the refrigerant drawn from the refrigerant suction port are mixed and discharged from an outlet of the ejector; and an evaporator located to evaporate the refrigerant to be drawn into the refrigerant suction port or the refrigerant discharged from the outlet of the ejector, a throttle mechanism configured to decompress the refrigerant, the throttle mechanism being separate from the ejector; wherein the evaporator includes a plurality of tubes defining refrigerant passages through which refrigerant flows, a tank that is disposed at one end side of the tubes for distributing refrigerant into the tubes and for collecting the refrigerant from the tubes, wherein the tank extends in a tank longitudinal direction that is parallel to an arrangement direction of the tubes;

the end portion of the tank has a hole portion for inserting the ejector;

the ejector is inserted into an inner space of the tank from the hole portion a refrigerant passage forming member is disposed at an end portion of the tank in the tank longitudinal direction;

the refrigerant passage forming member is provided with a refrigerant inlet for introducing the refrigerant, a refrigerant outlet for discharging the refrigerant, the hole portion separate from the refrigerant inlet and the refrigerant outlet, a refrigerant path through which the refrigerant inlet communicates with an inlet of the nozzle part, and a branch passage through which the refrigerant path communicates with an inlet side of the throttle mechanism.

22. The integrated unit according to claim 21, wherein:
the evaporator includes an evaporator part located to evaporate the refrigerant to be drawn into the refrigerant suction port;
the inner space of the tank includes a tank space for collecting the refrigerant from the tubes; and
the ejector is inserted into the tank space of the inner space of the tank, and the refrigerant suction port directly communicates with the tank space.

23. The integrated unit according to claim 22, wherein the evaporator is a downstream evaporator located at a downstream side in an air flow direction to evaporate the refrigerant to be drawn into the refrigerant suction port, the integrated unit further comprising
an upstream evaporator that is located upstream of the downstream evaporator in the air flow direction, wherein:
the upstream evaporator is arranged for evaporating the refrigerant discharged from the outlet of the ejector;
the tank space is positioned at a refrigerant outlet side for collecting the refrigerant from the tubes.

24. The integrated unit according to claim 21, wherein:
the inner space of the tank is partitioned into a collecting space part for collecting the refrigerant from the tubes, and a distributing space part for distributing the refrigerant into the tubes;
the ejector is inserted into the collecting space part of the tank; and
a number of the tubes communicating with the collecting space part of the tank is larger than a number of the tubes communicating with the distributing space part.

* * * * *

UNITED STATES PATENT AND TRADEMARK OFFICE
CERTIFICATE OF CORRECTION

PATENT NO. : 7,770,412 B2  Page 1 of 1
APPLICATION NO. : 11/654316
DATED : August 10, 2010
INVENTOR(S) : Naohisa Ishizaka et al.

It is certified that error appears in the above-identified patent and that said Letters Patent is hereby corrected as shown below:

Title Page, Foreign Application Priority Data:
"Jan. 20, 2000 (JP)" should be --Jan. 20, 2006 (JP)--

Signed and Sealed this

Sixteenth Day of November, 2010

David J. Kappos
*Director of the United States Patent and Trademark Office*